US012311527B2

(12) United States Patent
Yang et al.

(10) Patent No.: US 12,311,527 B2
(45) Date of Patent: May 27, 2025

(54) CONTAINER

(71) Applicant: Stanley Black & Decker MEA FZE, Dubai (AE)

(72) Inventors: Shun-Chi Yang, Taichung (TW); Wan-Chiang Wang, Taichung (TW); Ching-Yi Tu, Taichung (TW)

(73) Assignee: Stanley Black & Decker MEA FZE, Dubai (AE)

( * ) Notice: Subject to any disclaimer, the term of this patent is extended or adjusted under 35 U.S.C. 154(b) by 99 days.

(21) Appl. No.: 17/752,451

(22) Filed: May 24, 2022

(65) Prior Publication Data

US 2022/0371176 A1 Nov. 24, 2022

(30) Foreign Application Priority Data

May 24, 2021 (EP) .................................... 21175506

(51) Int. Cl.

| | |
|---|---|
| ***B25H 3/02*** | (2006.01) |
| ***A47B 88/423*** | (2017.01) |
| ***E05B 65/468*** | (2017.01) |
| ***E05B 65/52*** | (2006.01) |

(52) U.S. Cl.

CPC ........... *B25H 3/028* (2013.01); *A47B 88/423* (2017.01); *E05B 65/468* (2013.01); *E05B 65/5253* (2013.01)

(58) Field of Classification Search

CPC ..... B25H 3/028; A47B 88/423; E05B 65/468; E05B 65/5253; E05B 65/52; B65D 7/10; B65D 9/08; B65D 11/12; B65D 25/02; B65D 25/54; B65D 55/02

See application file for complete search history.

(56) References Cited

U.S. PATENT DOCUMENTS 1,744,646 A * 1/1930 Mathies ................ E05B 65/468 312/221
1,926,897 A * 9/1933 Freiberg ................ E05B 65/468 312/219
1,928,265 A * 9/1933 Rand ..................... E05B 65/468 312/217

(Continued)

FOREIGN PATENT DOCUMENTS

DE 19705473 A1 8/1998
JP 02034106 A * 2/1990

(Continued)

OTHER PUBLICATIONS

Extended European Search Report, EP Application No. 21175506.1, Nov. 12, 2021, 8 pages, EPO.

(Continued)

*Primary Examiner* — Hanh V Tran
(74) *Attorney, Agent, or Firm* — Mintz, Levin, Cohn, Ferris, Glovsky and Popeo, P.C.

(57) ABSTRACT

A storage container including a plurality of drawers for holding items therewithin. Each drawer may be held closed within the container by selective rotation of a detent mechanism which interacts with engagement means formed on each drawer. When the detent mechanism is in its open position, each drawer may be freely opened or closed. Whereas, when the detent mechanism is in its closed position, each drawer may be moved from an open to a closed position, but not from a closed to an open position.

19 Claims, 20 Drawing Sheets

(56) References Cited

U.S. PATENT DOCUMENTS

| | | | | | |
|---|---|---|---|---|---|
| 2,276,197 | A * | 3/1942 | Houston | E05B 65/468 312/333 |
| 2,498,271 | A * | 2/1950 | Hearn | E05B 65/468 312/221 |
| 3,023,066 | A * | 2/1962 | Mohr | E05B 65/468 312/219 |
| 3,038,770 | A * | 6/1962 | Kurens | A47B 47/02 312/221 |
| 3,241,902 | A * | 3/1966 | Lay | A47B 88/994 312/334.13 |
| 3,297,376 | A * | 1/1967 | Barstow | E05B 65/468 312/328 |
| 3,560,068 | A * | 2/1971 | Ostrom | E05B 65/468 312/217 |
| 3,857,620 | A * | 12/1974 | Korell | E05B 65/468 312/219 |
| 4,352,529 | A * | 10/1982 | Steinke | E05B 65/468 312/219 |
| 4,522,288 | A * | 6/1985 | Wickman | A45C 13/26 190/117 |
| 4,684,178 | A * | 8/1987 | Craig | E05B 65/468 312/217 |
| 4,705,326 | A * | 11/1987 | Craig | E05B 65/468 312/216 |
| 4,775,199 | A * | 10/1988 | Lanius | E05B 65/52 312/220 |
| 5,915,803 | A * | 6/1999 | Daugherty | A47B 67/04 312/265.5 |
| 6,385,050 | B1 * | 5/2002 | Orita | G11B 33/0438 361/801 |
| 7,832,584 | B2 | 11/2010 | Eggers et al. | |
| 9,901,170 | B2 | 2/2018 | Tam | |
| 9,962,826 | B1 * | 5/2018 | Surridge | B25H 3/028 |
| 2007/0273255 | A1 | 11/2007 | Purdy | |
| 2007/0278913 | A1 * | 12/2007 | Liu | E05B 65/462 312/220 |
| 2018/0200875 | A1 * | 7/2018 | Wolle | B25H 3/028 |
| 2018/0213934 | A1 * | 8/2018 | Wolle | E05B 65/46 |
| 2019/0039233 | A1 * | 2/2019 | Liu | B25H 3/028 |
| 2021/0076821 | A1 * | 3/2021 | Frank | A47B 88/427 |

FOREIGN PATENT DOCUMENTS

| | | | | |
|---|---|---|---|---|
| WO | WO-2006136858 | A1 * | 12/2006 | A47B 51/00 |
| WO | WO-2014125488 | A2 * | 8/2014 | A47B 47/0091 |

OTHER PUBLICATIONS

Communication under Rule 71(3) EPC, EP Application No. 21175506.1, Jan. 16, 2024, 8 pages, EPO.

* cited by examiner

CONTAINER

I. FIELD OF THE INVENTION

The present invention relates to containers which include a plurality of storage sections, such as drawers, each of which may be opened or closed. When a storage section is closed, its inside (and, hence the contents thereof) is inaccessible to a user of the container. Whereas, when the storage section is open, a user may access the inside thereof. The present invention has particular, although not exclusive, relevance to such containers as are used for holding and transporting tools and the like.

II. BACKGROUND OF THE INVENTION

Retention and transportation of tools within a container is a common requirement for tradespeople, who have to be able to transport their tools from one worksite to another, or to be able to store the tools securely within the container. Because such a tradesperson may need regular and frequent access to their tools when working on a jobsite, the ease with which a tool may be removed and then replaced within the container becomes an important issue. A time-consuming process to open and/or securely close a storage section of the container may take up too much valuable time.

Whilst the provision of the ability to lock a storage section in either its open or closed position may be an attractive proposition, as a practical matter, ease of access and speed of opening and closing the storage section is equally important. The ability to lock a storage section in its closed position can be a requirement either as a default position (to prevent inadvertent opening of the storage section, which could cause the contents thereof to be spilled), or as an optional feature to be employed when the container is being transported, for example, from one jobsite to another.

Containers employing lockable storage sections are known. Examples include U.S. Pat. No. 9,901,170 which discloses a cabinet including a plurality of slidable drawers. Each draw can be individually locked (to prevent opening) or unlocked (to permit opening).

U.S. Pat. No. 7,832,584 shows a tool chest having a plurality of drawers which can all be locked by hinged doors to prevent the drawers from sliding open when the chest is being transported from site to site.

There exists a problem with such known lockable containers, however. In order for a user to be able to close the storage section, they need to perform the task of unlocking the storage sections against their movement restraint. This might seem a trivial task, but it takes time and the cumulative effect of repeating this operation over the course of a day's work can become quite time-consuming.

It would be desirable or an object of the present invention, therefore, to provide a container to overcome existing problems of known lockable containers.

III. SUMMARY OF THE INVENTION

Some preferred or advantageous features of the present invention are found in the claims.

By provision of a detent mechanism which permits selective interaction with the engagement means of each storage means such that the storage means is able to be moved from its open position to its closed position even if/when the detent mechanism is arranged to restrain each storage section in its respective closed position, the present invention provides a more versatile container than has hitherto been available. In particular, this enables a user of the container to simply and quickly close an open storage section, even when the container is in its locked/closed state (ie drawers to be prevented from being opened).

According to a further object of the invention, there is provided a container comprising: a housing defining a drawer opening and lock opening; a plurality of drawers disposed in the drawer opening and wherein each of said drawers is configured to move between an open and closed position, wherein in said open position, access to an interior of the drawer is uninhibited, and in said closed position, access to the interior of the drawer is inhibited; a rotating lock disposed in the lock opening and having a series of cams and flats, and wherein said rotating lock is configured to rotate between a locked position and an unlocked position, wherein in said locked position, a cam prevents a drawer from moving from its closed position to its open position, and wherein in said unlocked position a flat permits a drawer may move freely between its open and closed position; and characterized in that each of the drawers includes a stop having a ramped surface and a locking surface, and wherein the ramped surface is configured engage a cam and permit a drawer to move from its open position to its closed position, when the rotating lock is in its locked position, and wherein the stop is configured to engage a cam and prevent a drawer from moving from its closed position to its open position when the rotating lock is in its locked position.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein, "connected" or "attached" includes physical or electrical, whether direct or indirect, affixed or adjustably mounted. Thus, unless specified, "connected" or "attached" is intended to embrace any operationally functional connection.

As used herein, "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and approaching or approximating such a physical or functional characteristic.

In the following description, reference is made to the accompanying attachments and drawings which are provided for descriptive and illustration purposes as representative of specific exemplary embodiments in which the invention may be practiced. Given the following description of the specification and drawings, the apparatus, methods, and systems should become evident to a person of ordinary skill in the art. Further areas of applicability of the present teachings will become apparent from the description and illustrations provided herein. It is to be understood that other embodiments can be utilized and that structural changes based on presently known structural and/or functional equivalents can be made without departing from the scope of the invention.

IV. DESCRIPTION OF THE DRAWINGS

The above-mentioned and other features, embodiments, and advantages of this invention, and the manner of attaining them, will become more apparent and the invention will be better understood by reference to the following descriptions of embodiments of the invention taken in conjunction with the accompanying drawings, wherein.

Figure 1:
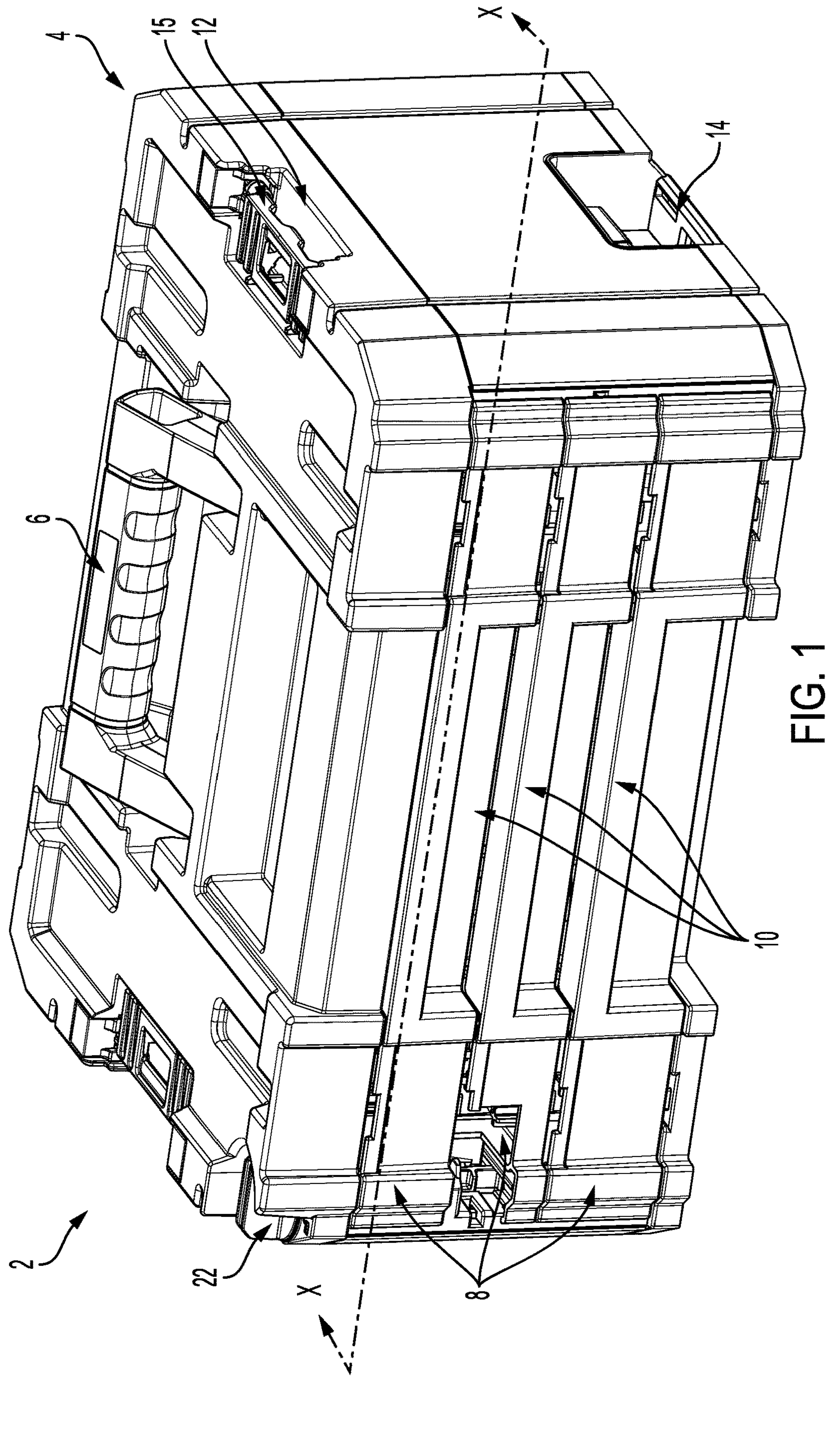
FIG. 1 shows a perspective view of a container in accordance with the present invention.
Figure 11C:
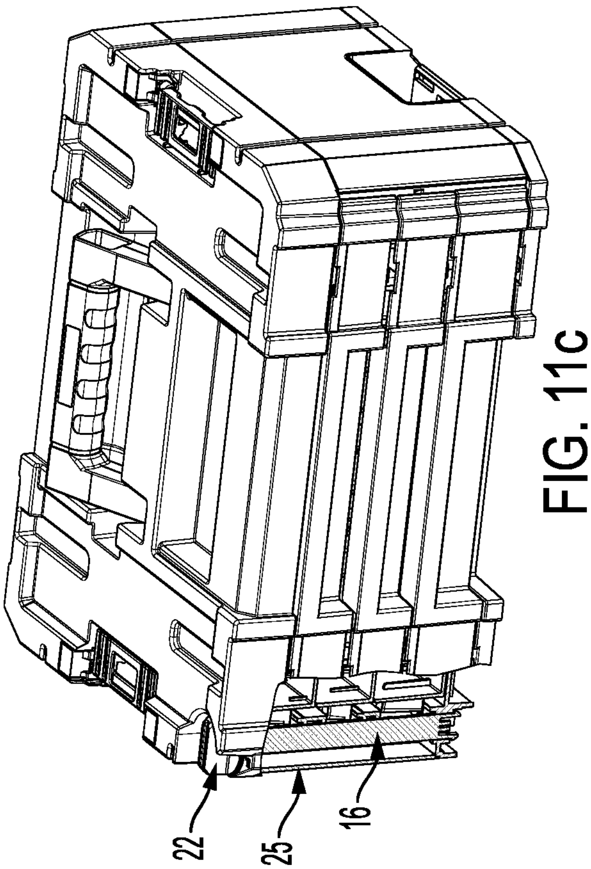
Figure 11D:
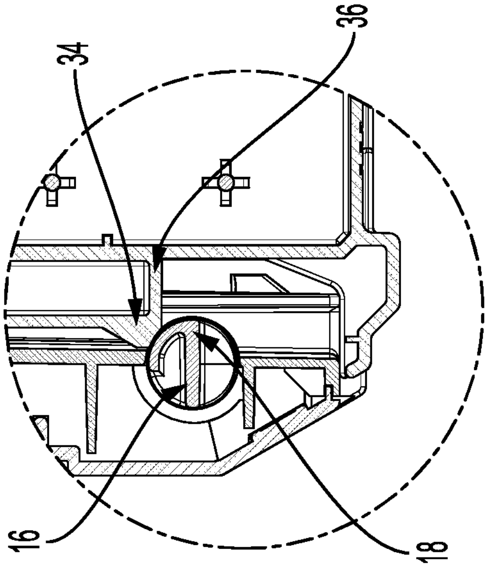
Figure 11A:
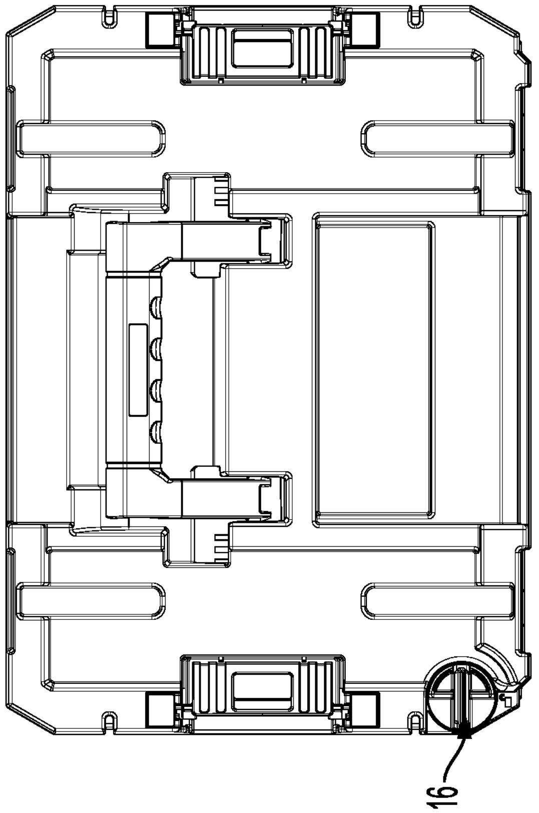
Figure 11B:
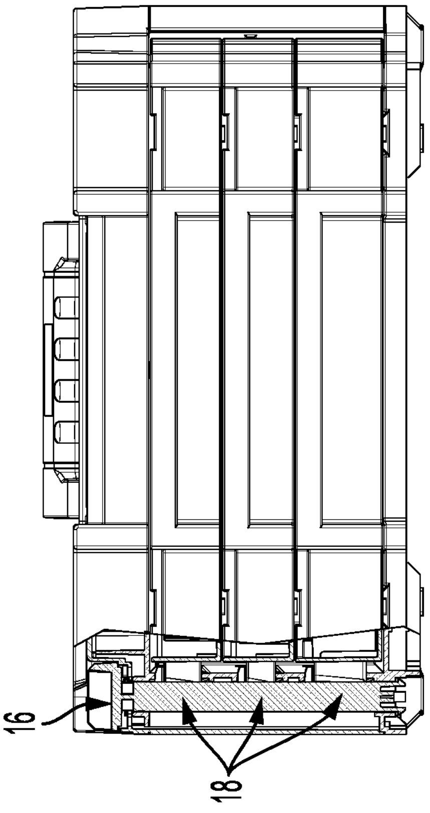

FIG. 11*a* shows a plan view from above of the container of FIG. 1 with the lock in its locked position;

FIG. 11*b* shows a partially-sectioned front view of FIG. 11*a;*

FIG. 11*c* shows a partially-sectioned perspective view of the container of FIGS. 11*a* and 11*b;*

FIG. 11*d* shows a schematic section of the interaction between the lock and the drawer of FIGS. 11*a*, 11*b* and 11*c;*

Figure 12C:
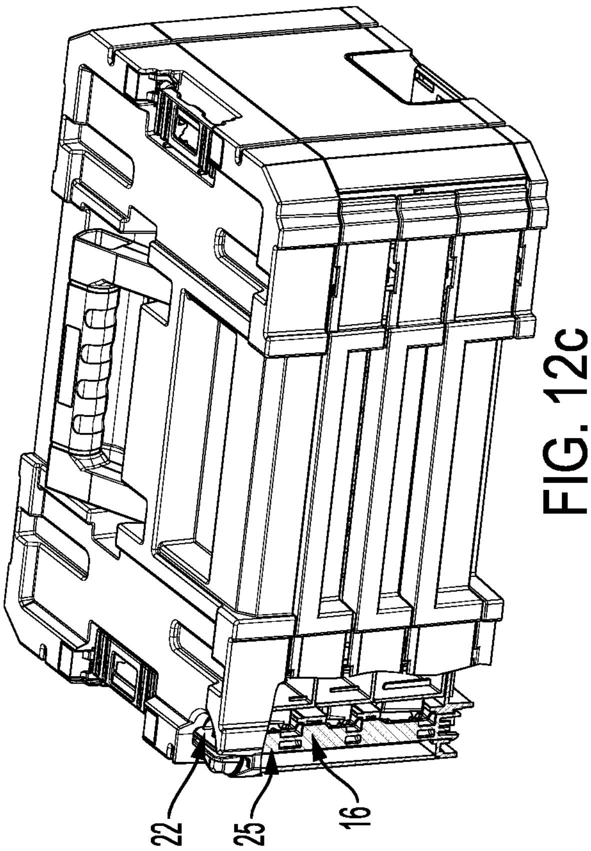
Figure 12D:
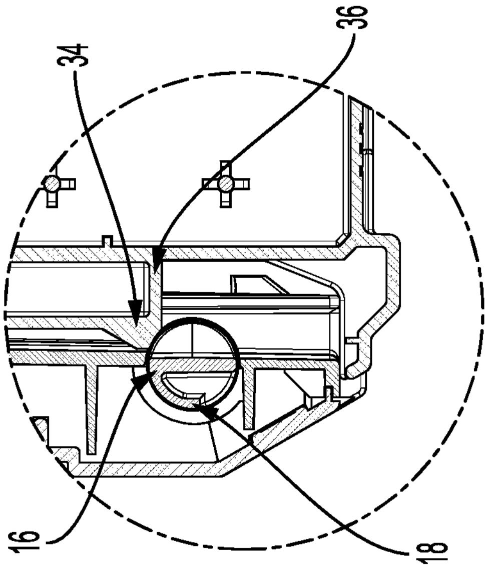
Figure 12A:
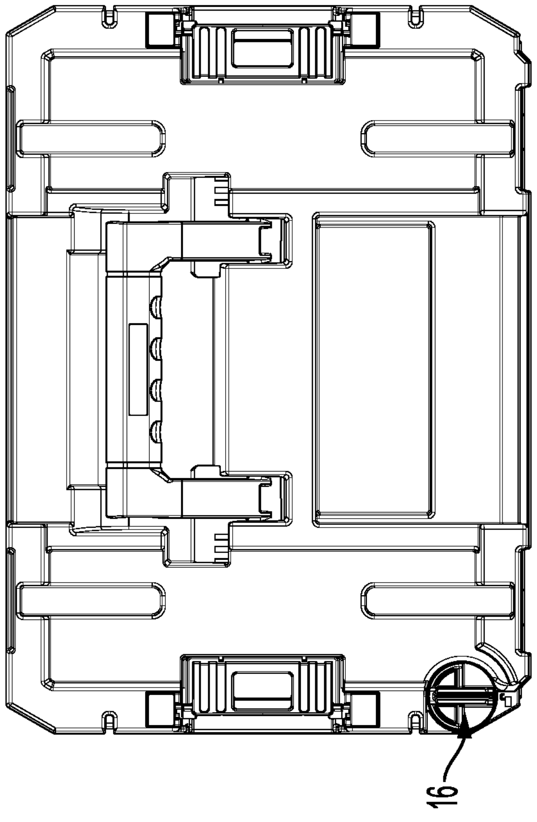
Figure 12B:
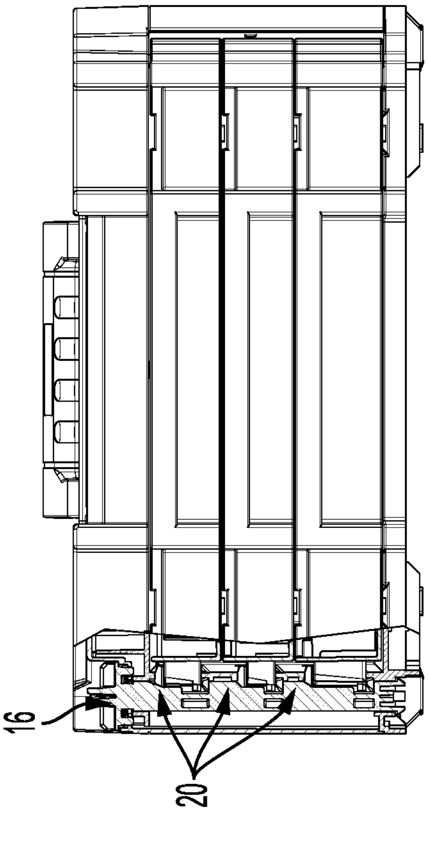

FIG. 12*a* shows a plan view from above of the container of FIG. 1 with the lock in its unlocked position;

FIG. 12*b* shows a partially-sectioned front view of FIG. 12*a;*

FIG. 12*c* shows a partially-sectioned perspective view of the container of FIGS. 12*a* and 12*b;*

FIG. 12*d* shows a schematic section of the interaction between the lock and the drawer of FIGS. 12*a*, 12*b* and 12*c*.

Figure 13B:
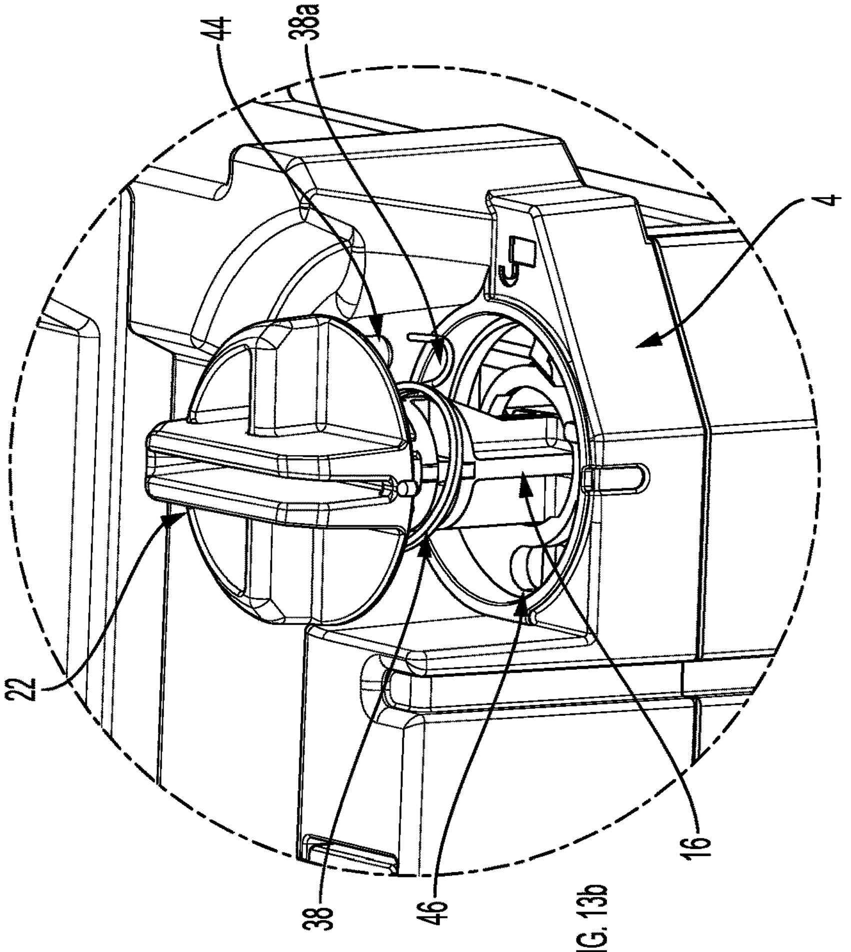
Figure 13A:
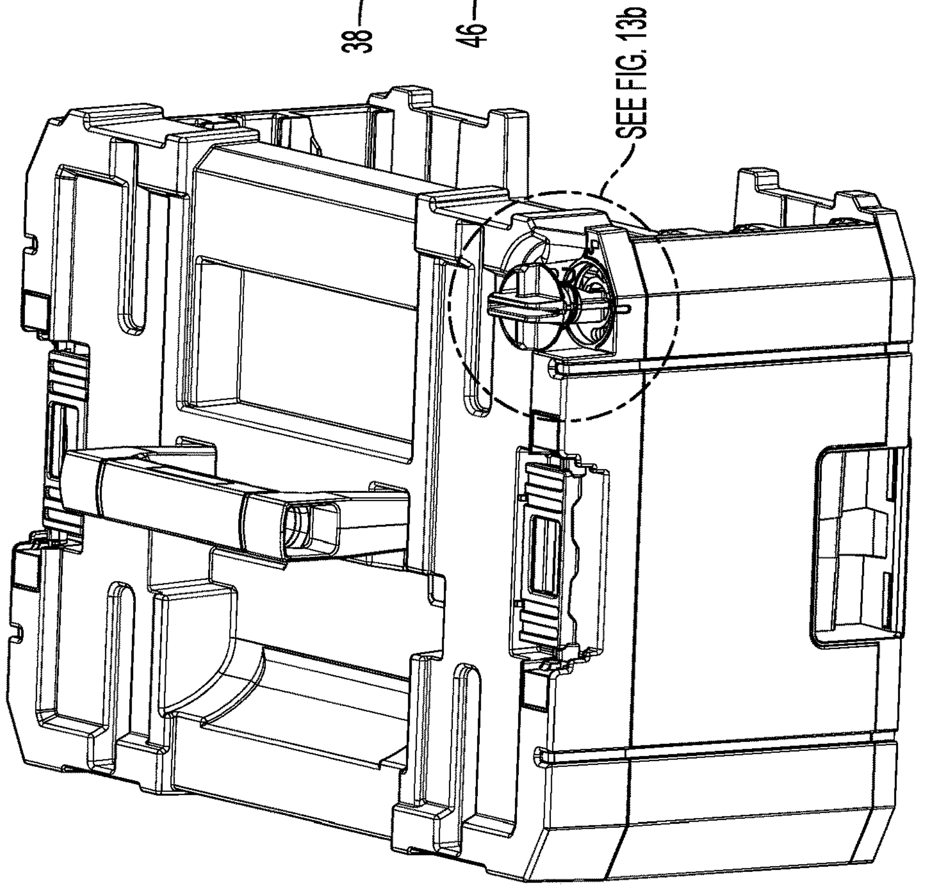

FIG. 13*a* shows a side perspective view from above of a container according to a second embodiment of the present invention;

FIG. 13*b* shows, in detail, the area A of FIG. 13*a;*

Figure 14B:
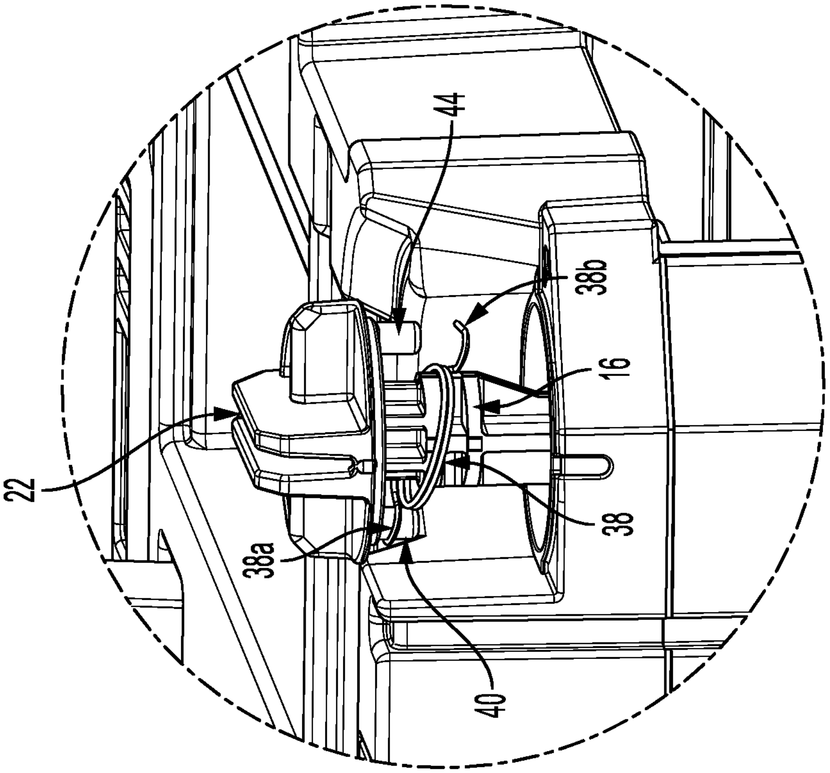
Figure 14A:
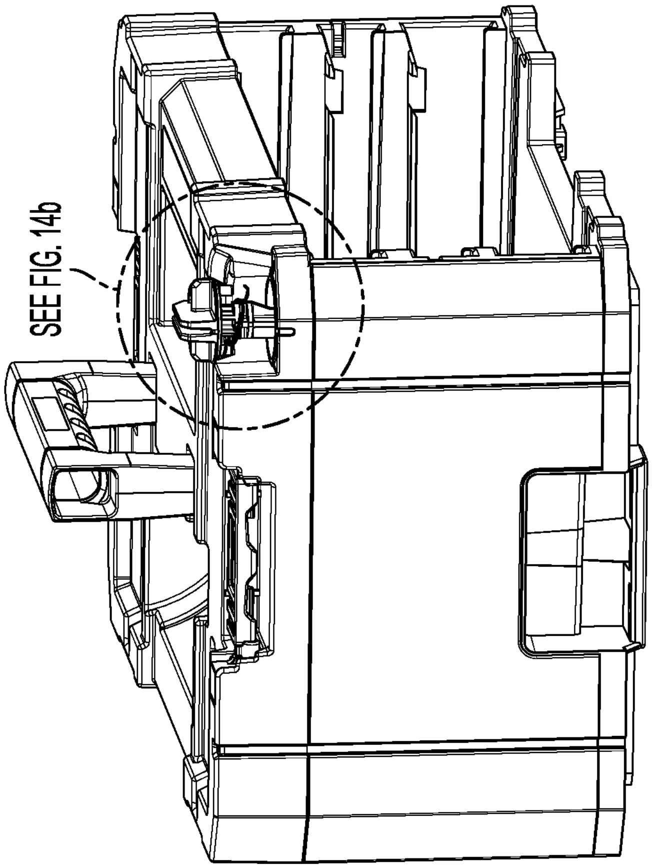

FIG. 14*a* shows a side perspective view of the container of FIG. 13*a;*

FIG. 14*b* shows, in detail, the area B of FIG. 14*a;*

Figure 15B:
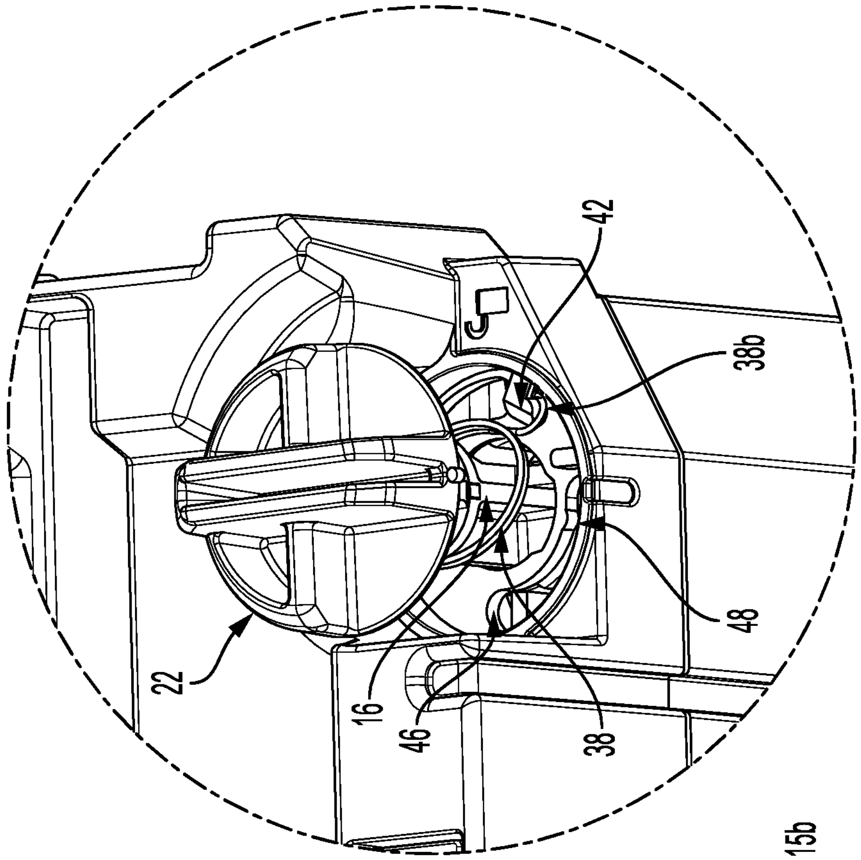
Figure 15A:
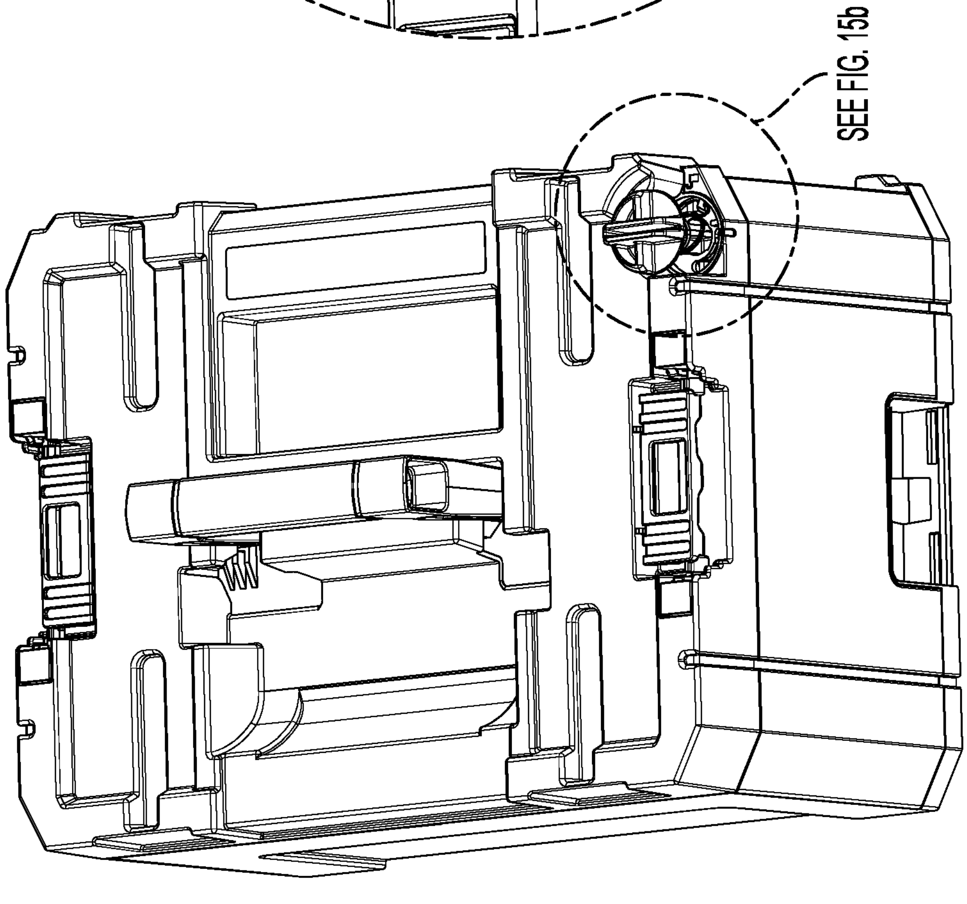

FIG. 15*a* shows a side perspective view from above of the container of FIG. 13*a;*

FIG. 15*b* shows, in detail, the area C of FIG. 15*a;*

Figure 16:
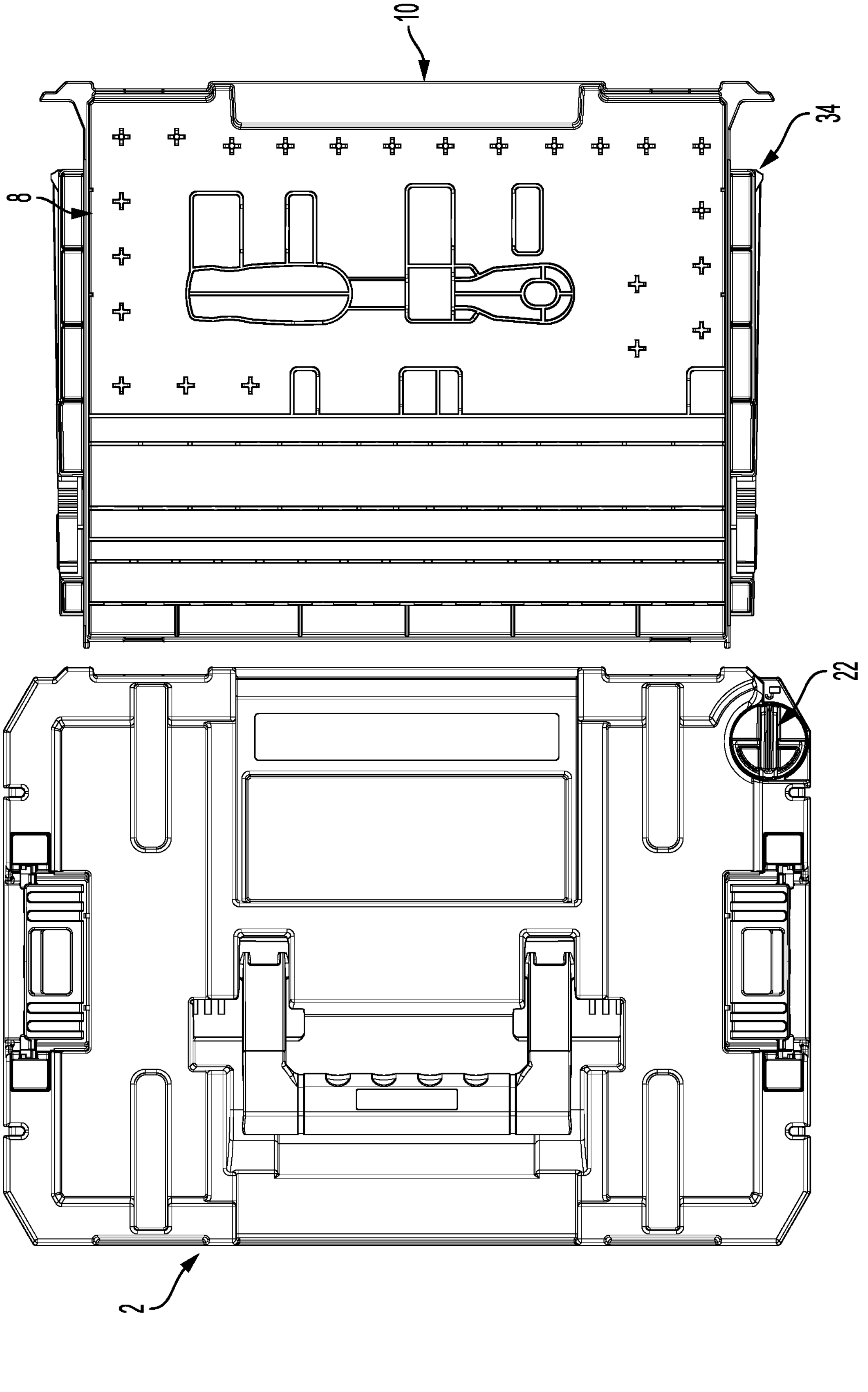
Figure 17B:
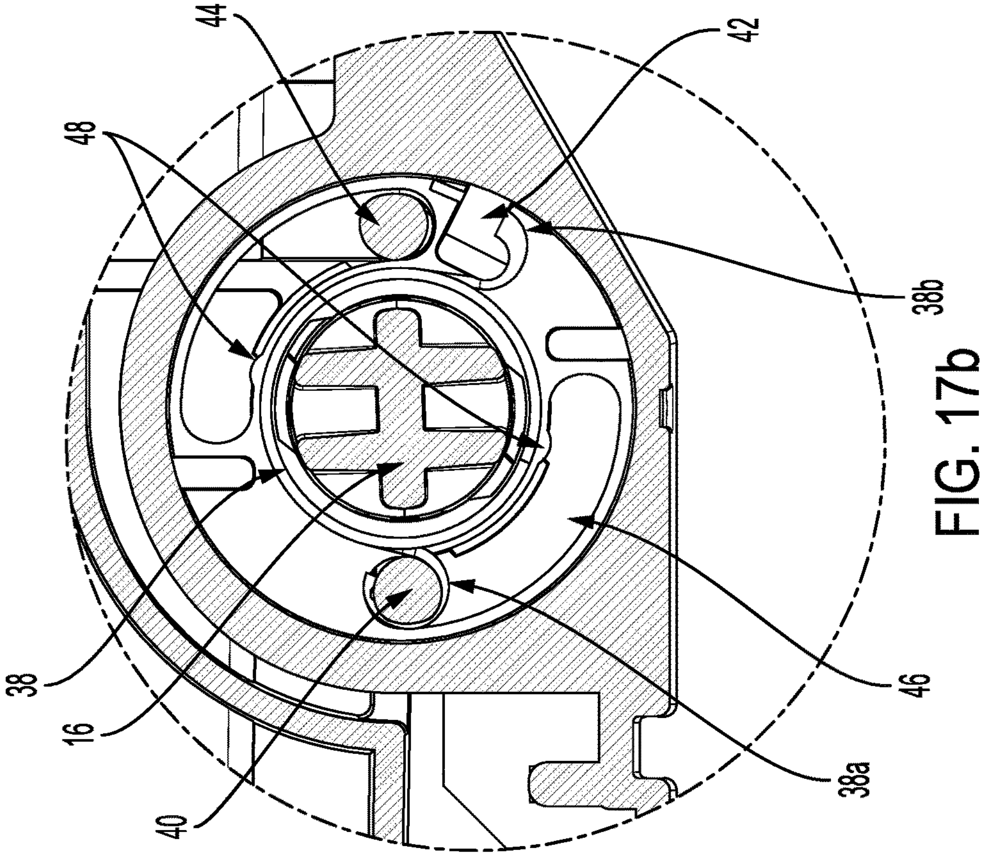
Figure 17A:
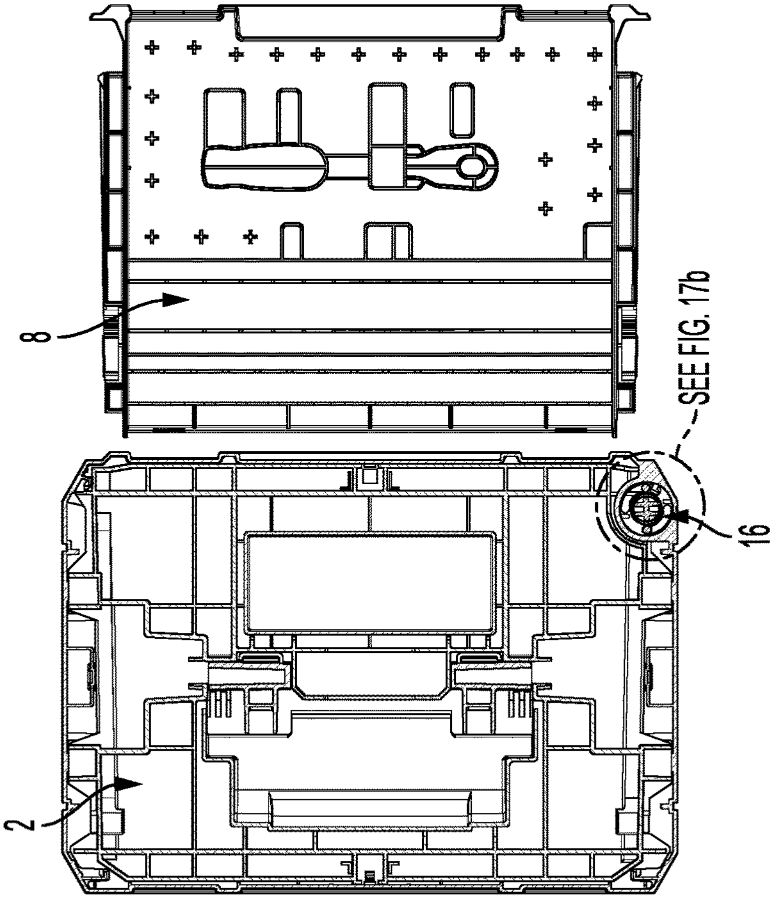

FIG. 16 shows a plan view from above of the container of FIG. 13, with its drawer in the open position;

FIG. 17*a* shows a part-sectional view, of the rotatable lock of FIG. 16;

FIG. 17 *b* shows a detailed view of the circled section of the rotatable lock of FIG. 17*a;*

Figure 18B:
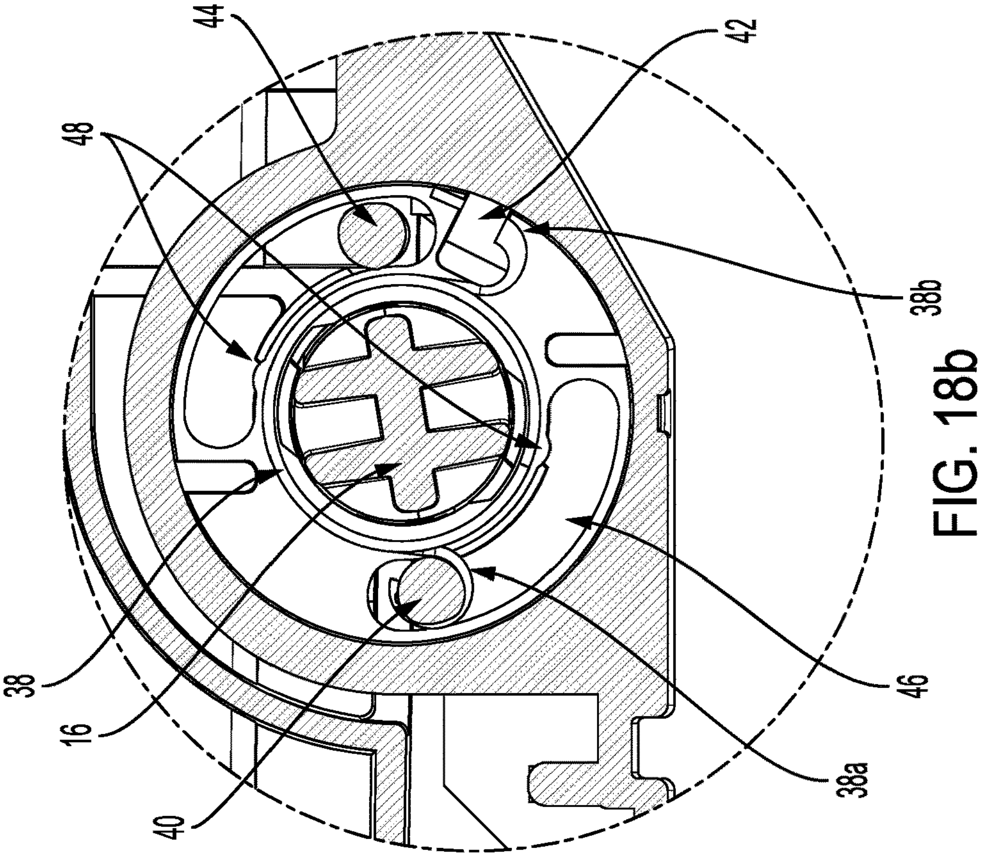
Figure 18A:
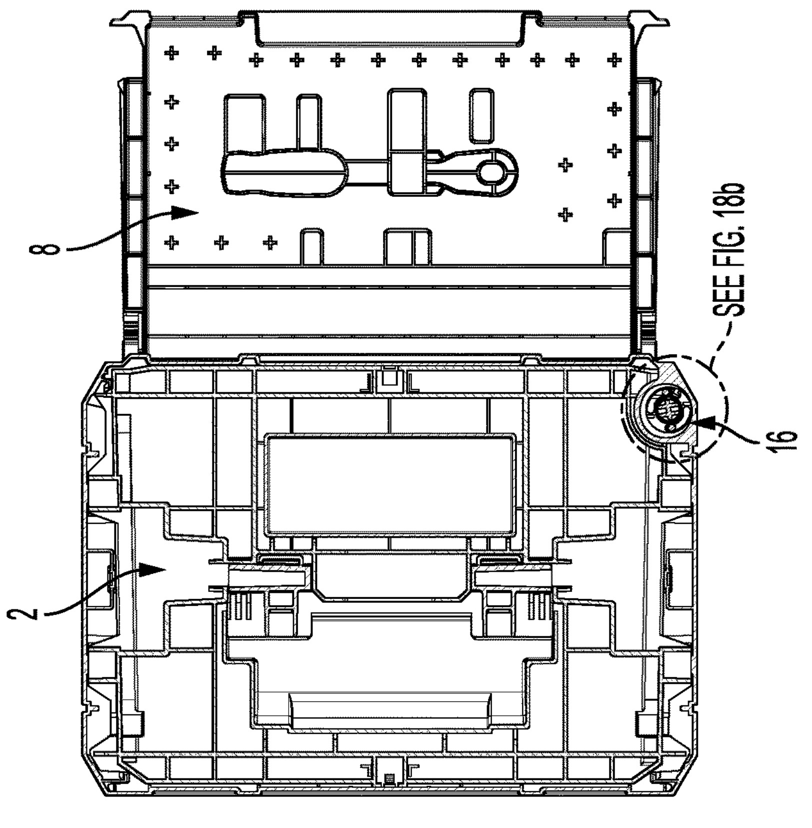

FIG. 18*a* shows a part-sectional view, of the rotatable lock of FIG. 16, when the drawer has started to move from its open towards its closed position;

FIG. 18*b* shows a detailed view of the circled section of the position of the rotatable lock of FIG. 18*a;*

Figure 19B:
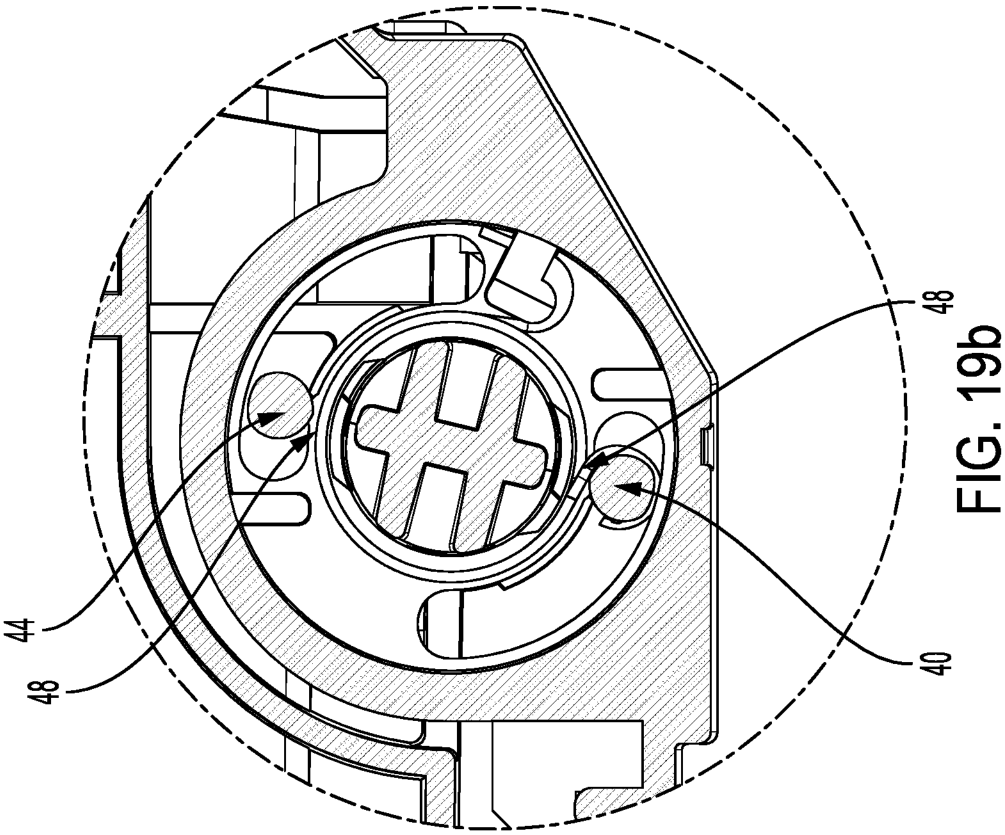
Figure 19A:
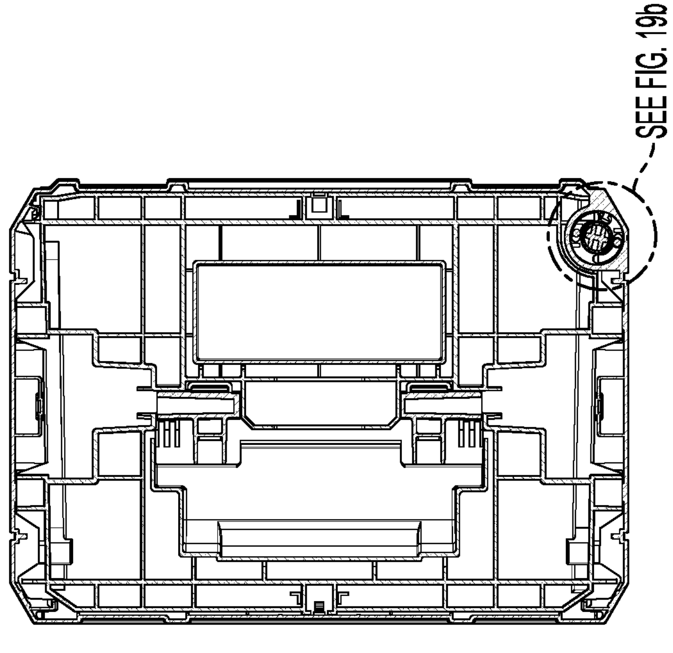

FIG. 19*a* shows a part-sectional view, of the rotatable lock of FIG. 16, when the drawer has moved to its closed position;

FIG. 19*b* shows a detailed view of the circled section of the position of the rotatable lock of FIG. 19*a*.

Figure 20B:
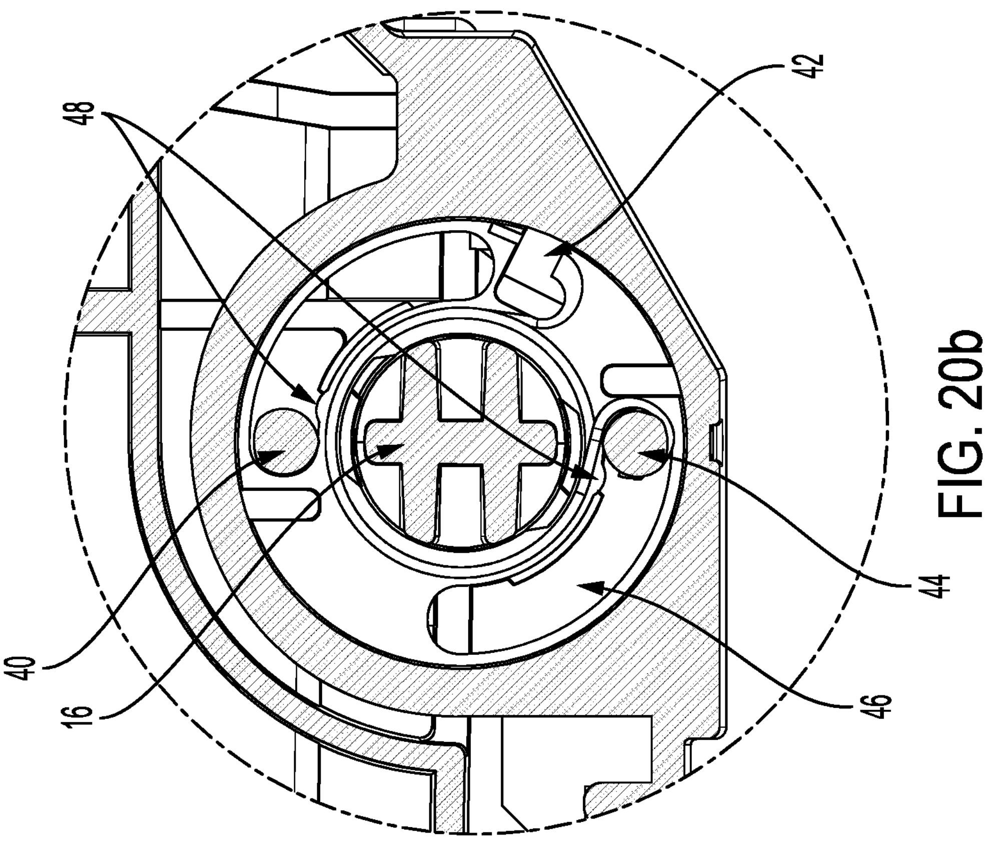
Figure 20A:
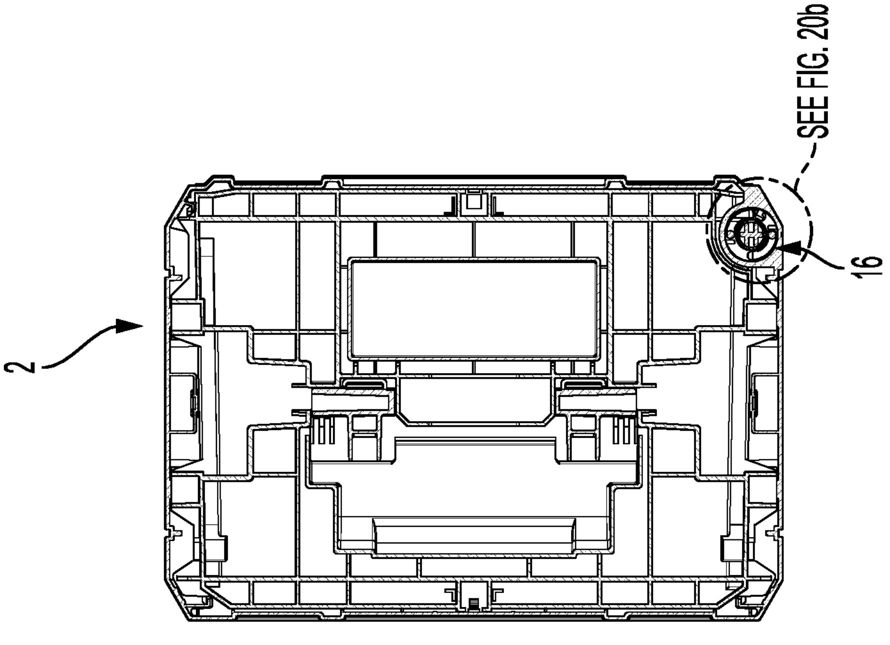

FIG. 20*a* shows a part-sectional view, of the rotatable lock of FIG. 16, when the drawer has moved to its closed position and the rotatable lock has been moved into its unlocked position;

FIG. 20*b* shows a detailed view of the circled section of the position of the rotatable lock of FIG. 20*a*.

Corresponding illustrated images and attachments indicate corresponding parts throughout the several views of the present invention. The exemplifications set out herein illustrate embodiments of the present invention, and such exemplifications are not to be construed as limiting the scope of the present invention in any manner.

These and other features of the invention will become apparent upon review of the following description of the presently preferred embodiments of the invention, taken into conjunction with the figures.

V. DESCRIPTION

A detailed description of apparatuses, methods, and systems, consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Referring firstly to FIG. 1, it can be seen that a container 2 comprises a plastics body 4 having a carrying handle 6 and a plurality (here three) of storage sections, here slidable drawers 8. Each of the drawers 8 can be moved either completely into the body 4 of the container 2 (i.e. into its "closed" position), or out (even partially) of the body 4 (i.e. into its "open" position), independently of any or all of the other drawers. To effect opening or closing of the drawers, each of them is formed with a front handle 10 which can be grasped by a user to move the drawer 8.

The container 2 includes upper 12 and lower 14 locators such that stacking of containers upon each other is possible. The upper and lower locators 12, 14 are lockable to each other via user-moveable latch means 15. The possible stacking of the containers 4 will not be described further herein, as this concept is well-known to those skilled in the art.

Figure 2:
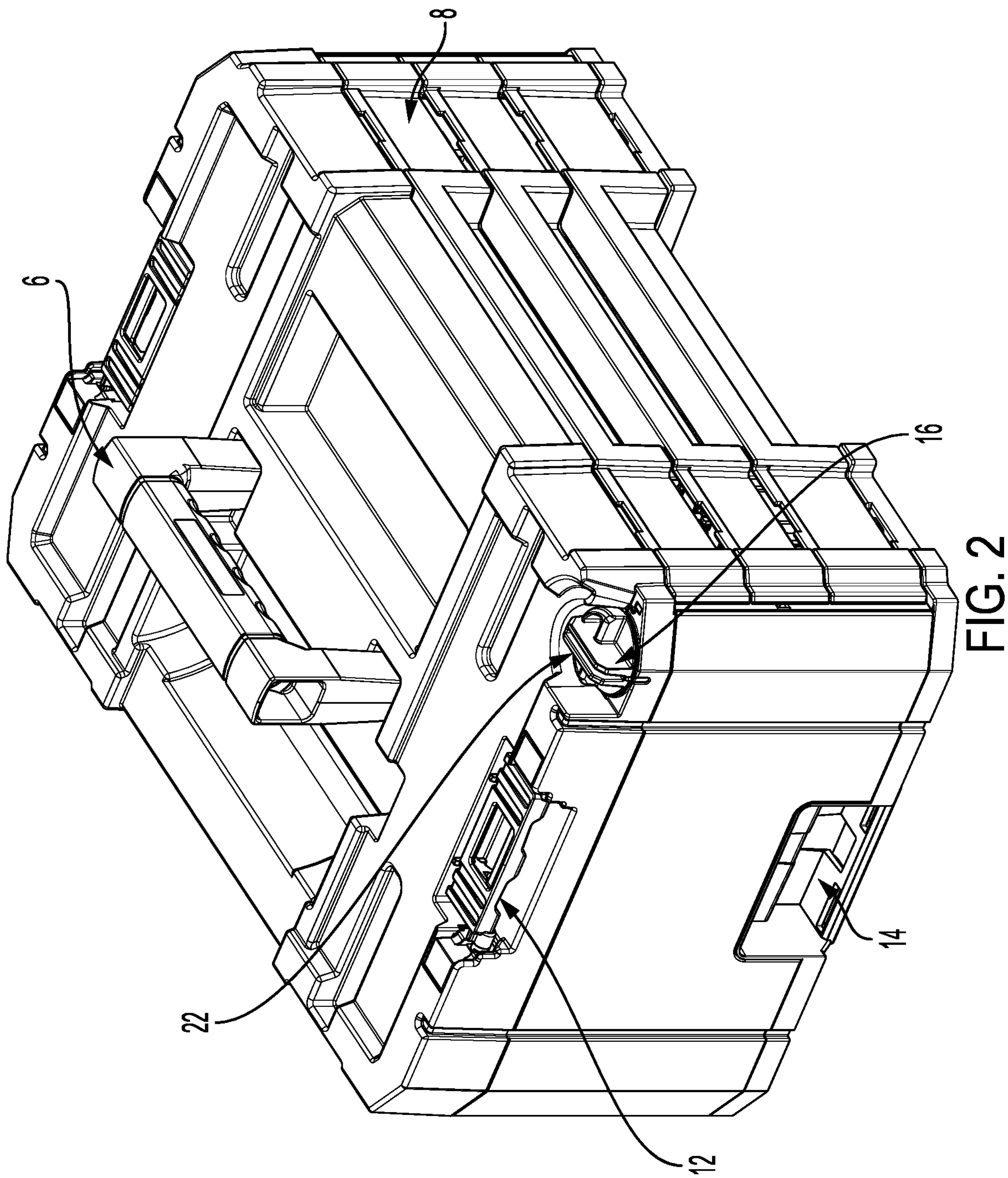
FIG. 2 shows a perspective view of the container of FIG. 1 with the detent mechanism in its locked position.

The container 2 includes a detent mechanism, here a rotatable lock 16. Reference to FIG. 2 shows the lock 16 positioned at one corner of the container. The lock 16, in this example, is manually-rotatable permitting a user of the container to move the detent mechanism between and to its "locked" or "unlocked" positions by a 90° rotation of the lock 16, as will be described in more detail below. When the rotatable lock 16 is in its locked position, any (or each, or all)

of the drawers 8 which are in their closed positions within the container 2 are unable to be opened. Whereas, when any (or each, or all) of the drawers 8 is in its open position, it can be moved by a user into its closed position—ie moved to be within the container 2. When the rotatable lock 16 is in its unlocked position, any (or each, or all) of the drawers 8 which are in their closed positions within the container 2 are able to be opened and any (or each, or all) drawers 8 which are in their open positions (ie outside—either partially, or fully) the container 2 are able to be closed. In other words, when the rotatable lock 16 is in its unlocked position, all of the drawers 8 have free movement between their open and closed positions.

In FIG. 2, the lock 16 is in its locked position, meaning that, as all the drawers 8 are closed and held within the container 2, then access to the insides of each drawer 8 is not possible. With the lock 16 in its locked position, all drawers 8 as shown in FIG. 2 which are closed are unable to be opened.

Figure 3:
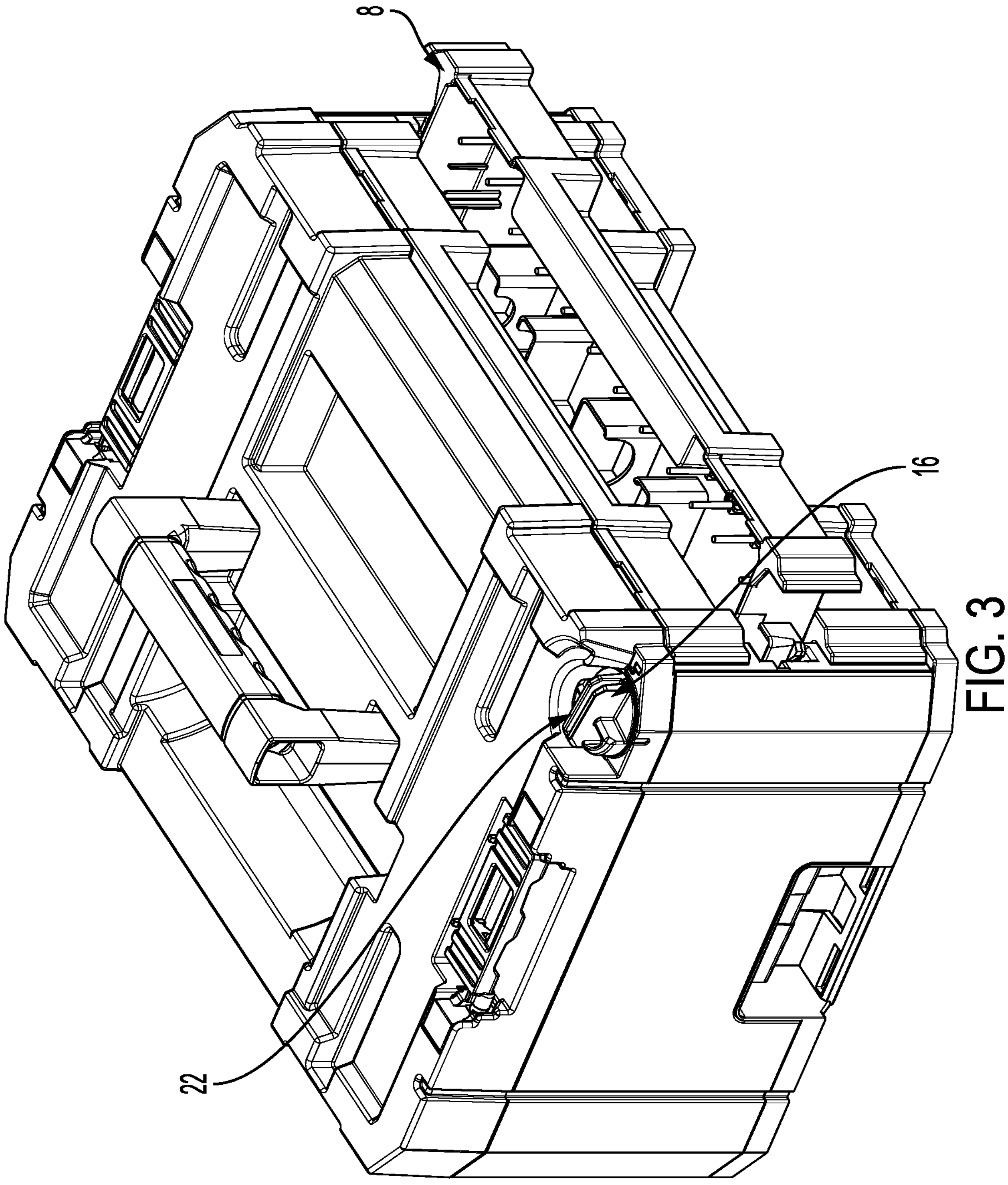
FIG. 3 shows a perspective view of the container of FIG. 1 with the detent mechanism in its unlocked position.

FIG. 3 shows the lock 16 having been rotated by 90° as compared to its position in FIG. 2, such that it is in its unlocked position, which permits any one, or ones, of the drawers 8 to be moved into its open position. In the figure, only the middle drawer 8 has been opened and only partially.

Figure 4:
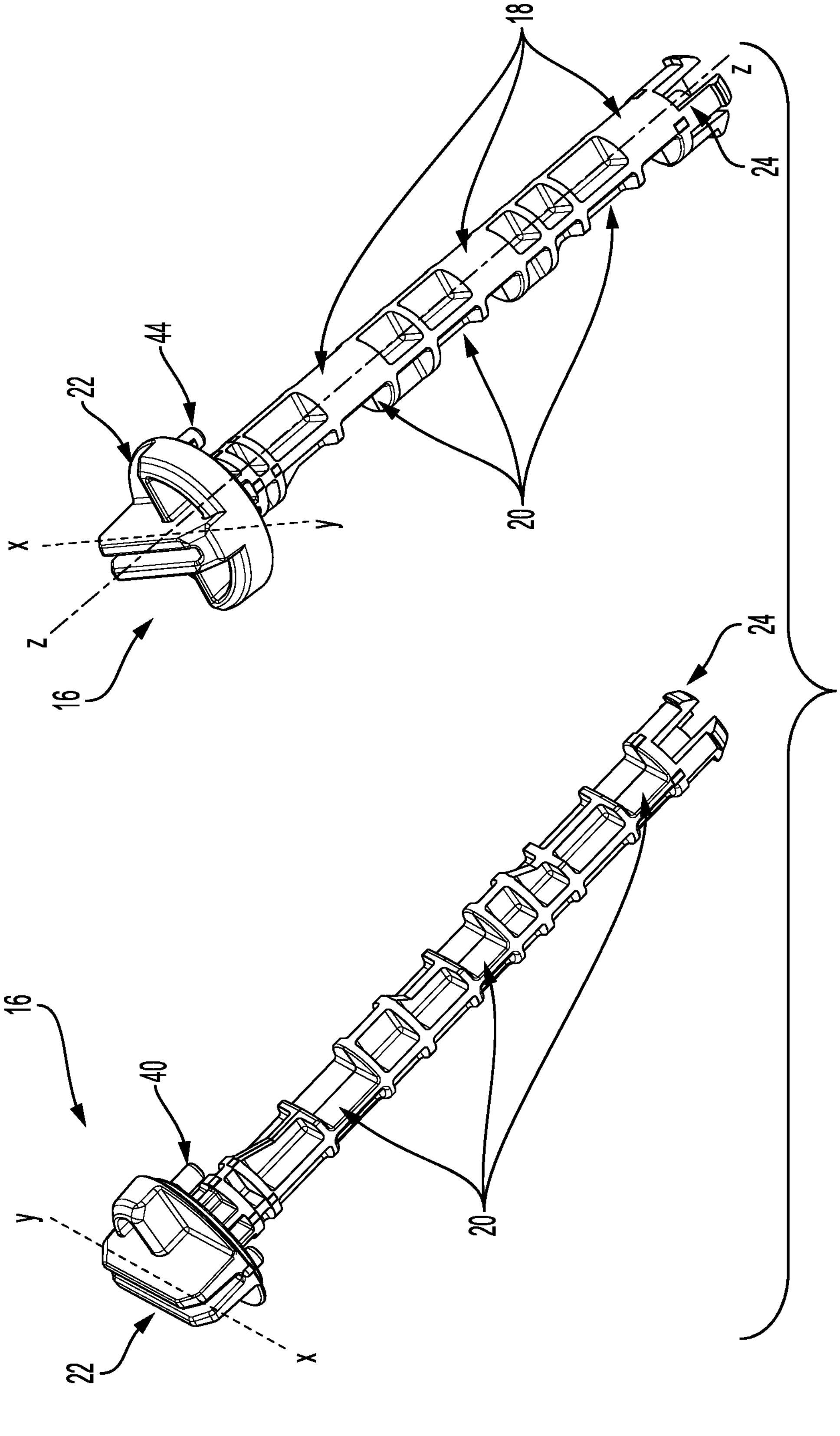
FIG. 4 shows two perspective views (each rotated through 180° with respect to the other) of the detent mechanism.
Figure 5:
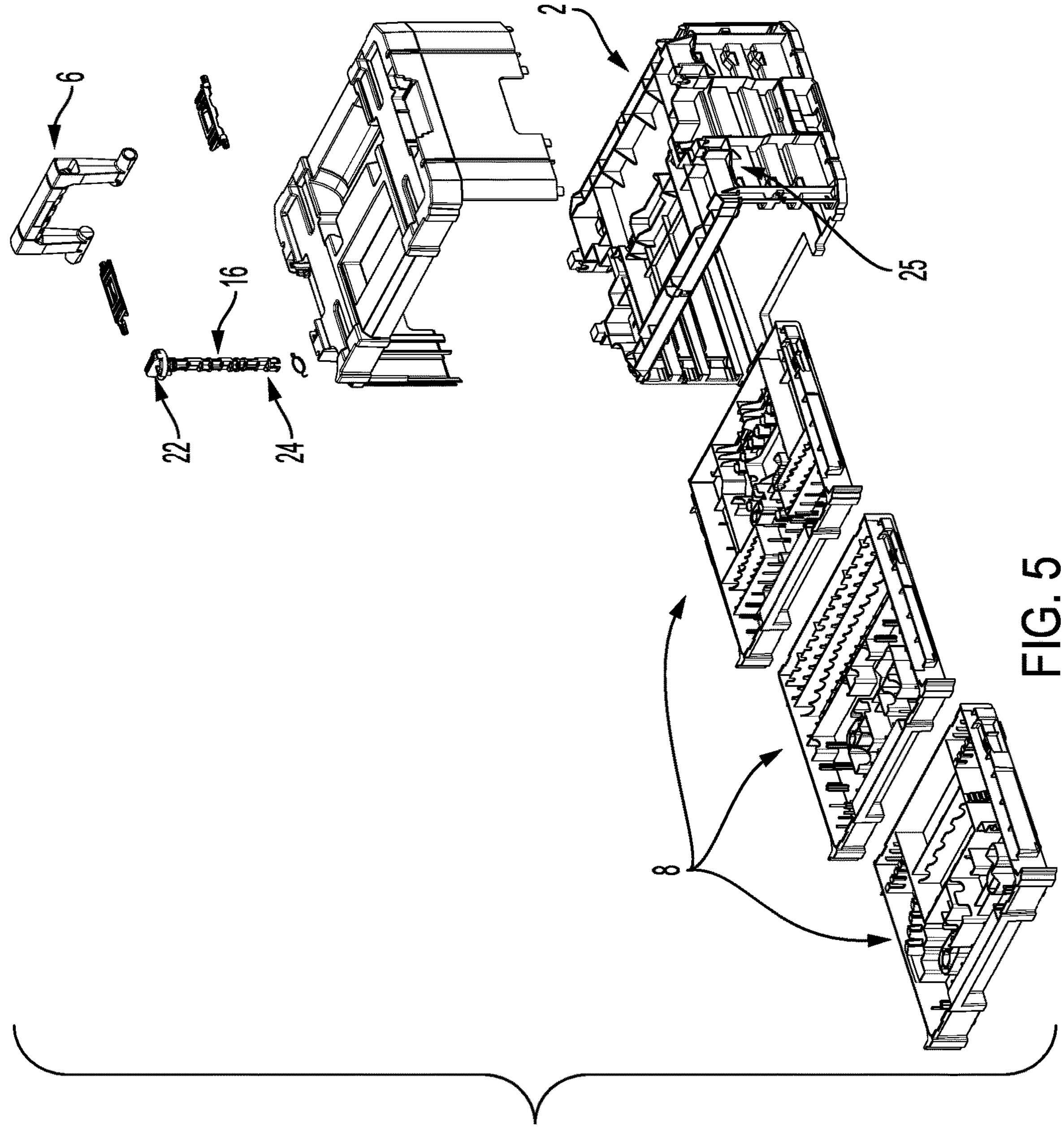
FIG. 5 shows an exploded perspective view of the major components of the container of FIG. 1.

Reference to FIGS. 4*a* and 4*b* show the lock 16 in two perspective views, where the lock 16 has been rotated through 180° as between FIG. 4*a* and FIG. 4*b*. It can be seen that the lock 16 has a series of alternating cams 18 and flats 20 extending axially along its major axis, z-z. The purpose of these cams 18 and flats 20 will be explained below.

At one end of the lock 16 is formed a manually-actuable knob 22 and at the other end a snap-fit retainer 24 to hold the lock 16 in place when inserted into the container 2. The lock 16 is generally circular in cross-section and extends along a major axis, z-z (see FIG. 4*b*). The lock is rotatable about this axis such that a user may grasp the knob 22 to affect rotation of the lock 16.

Figure 6:
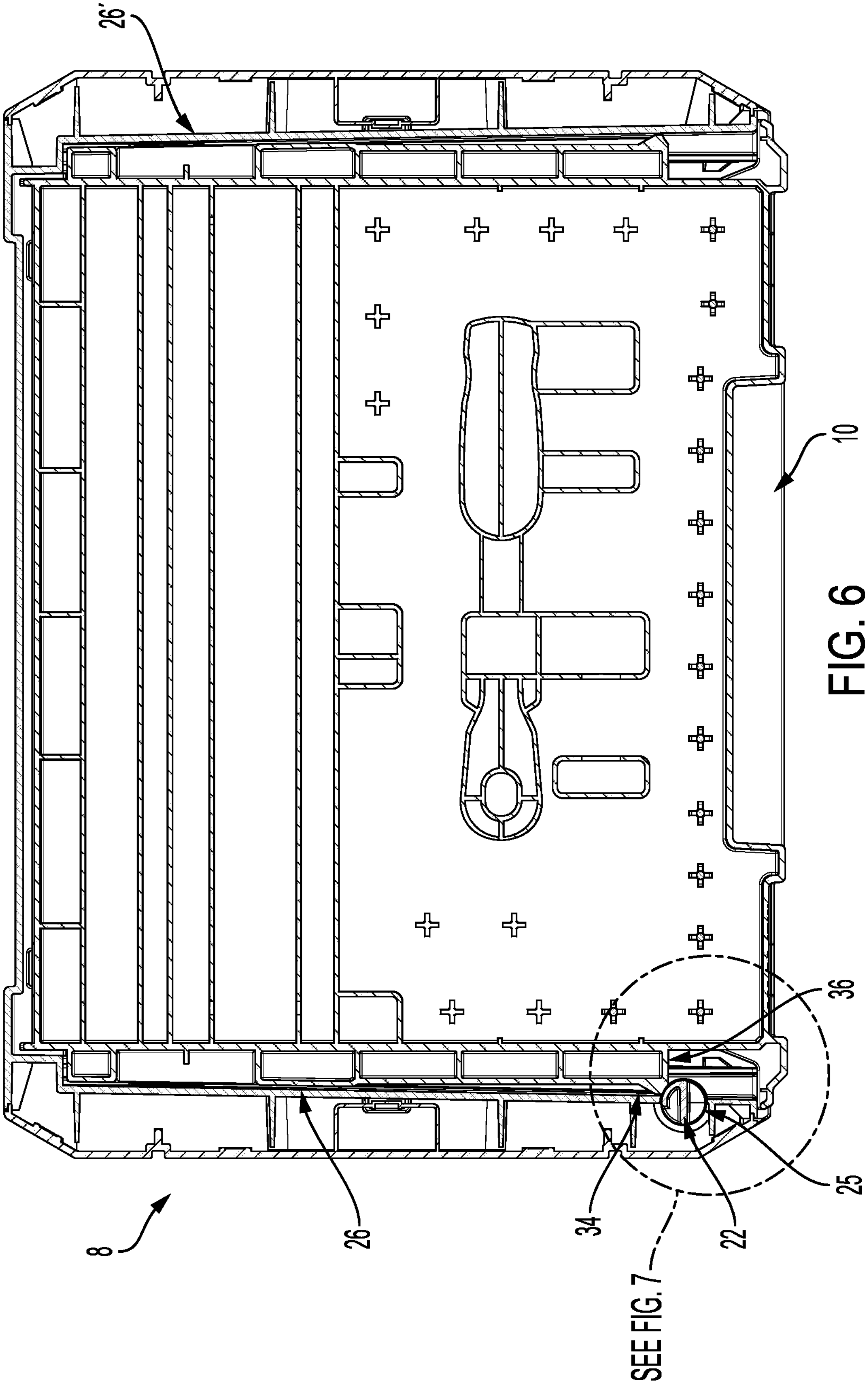
FIG. 6 shows a sectional view a drawer of the container of FIG. 1, along the line X-X.

FIG. 6 illustrates how the lock 16 fits into an axial channel 25 formed in the body of the container 2. Once held within the channel 25 by cooperation between the body of the container 2 and the snap-fit retainer 24, the lock 16 may be rotated about its axis z-z by a user exerting torque on the knob 22. The lock is able to rotate +/−90°, as will be explained below.

Referring now to FIGS. 7, 8, 9 and 10, it can be seen that a representative drawer 8 includes, in this example, its integral handle 10 with which a user of the container 2 may open and close the drawer 8. The drawer 8 is bounded (at its left-hand side as viewed at FIG. 8) by an engagement bar 26, which co-operates with a pair of container runners 28, 30 (see FIG. 10) in order to retain the drawer 8 in the container 2 and permit it to be opened and closed along internal container drawer slot 32. It will be appreciated that a similar engagement bar 26' is formed at the right-hand side of each drawer.

At the forward outside edge of the engagement bar 26 is formed an engagement means, in this example wedge 34. The purpose of the wedge 34 is to selectably co-operate with the rotatable lock 16, as will be explained. In this example, the co-operation is between the wedge 34 and the cams 18 and flats 20 of the rotatable lock 16.

In order to understand the interaction between the rotatable lock 16 and wedge 34, reference is made to FIGS. 11*a*, 11*b*, 11*c* and 11*d*, which all show the rotatable lock 16 in its locked position. In the locked position, the lock 16 prevents any opening from its closed position within the container 2 (either partial or full) of each drawer 8. However, in the unlocked position, if any one, ones, or all of the drawers 8 are open (either partially or fully), they may each be moved into their respective closed positions within the container. FIGS. 12*a*, 12*b*, 12*c* and 12*d* show the lock 16 in its unlocked position.

In FIGS. 11*a*-11*d* it can be seen that the knob 22 has been rotated such that each cam 18 of the rotatable lock 16 projects into the path of the drawer 8 such that the wedge 34 of the drawer 8 cannot be moved past the cam if and when a user makes any attempt to open the drawer from its closed (ie captive within the container 2) position to its open position. It is, therefore, not possible for the drawer 8 to be moved into its open position from being within the container 2 by being pulled via its handle 10 along the drawer slot 32. This is due to the interaction between the wedge 34 and the cam 18, here the abutting of the front outer surface 36 of the wedge 34 against the cam 18. This interaction may also be seen in FIG. 7. The cam 18 presents a physical barrier to the opening of the drawer 8 due to the contact between it and the front outer surface 36 of wedge 34.

As has been described above, the rotatable lock 16 comprises an axially-extending series of cams 18 and flats 20 (in this example 3 of each). FIGS. 11*b* and 11*d* show how the series of cams 18 present a physical block to the passage therepast of each respective drawer 8. Comparing these figures to their equivalent FIGS. 12*b* and 12*d*, however, in which the rotatable lock 16 has been rotated through 90°, shows how the flats 20 do not present a barrier to the opening (or, indeed any movement, be that opening or closing) of the respective drawers 8.

Hence, when the rotatable lock 16 has been rotated (via knob 22) into the position shown in FIG. 12, the user of the container 2 is able, via the handle 10, to freely move each and all drawers 8 between their open and closed positions. This is because there is no cam 18 to restrain the movement of the drawer 8 by engagement with the front outer surface 36.

Figure 7:
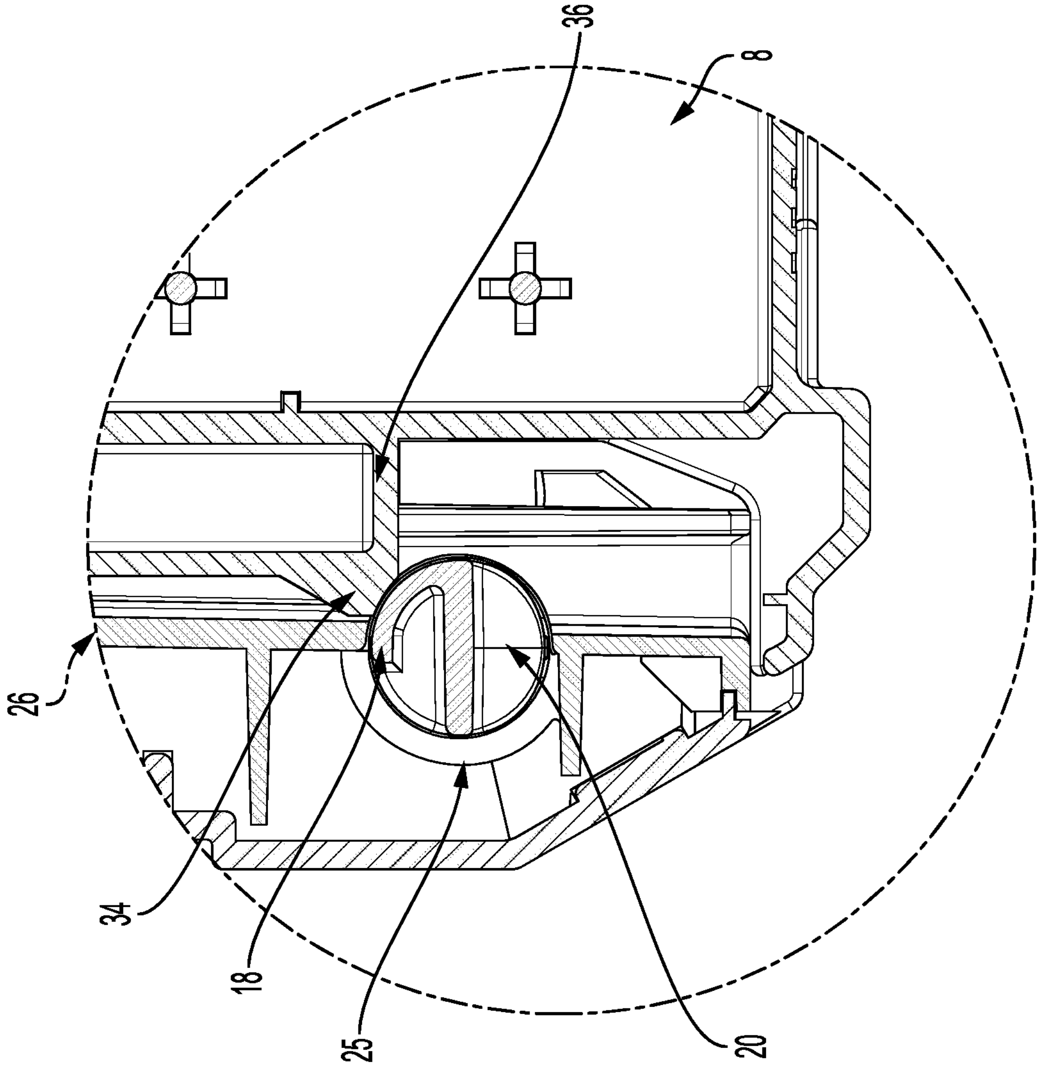
FIG. 7 shows a detailed sectional view of the area A of FIG. 6.
Figure 8:
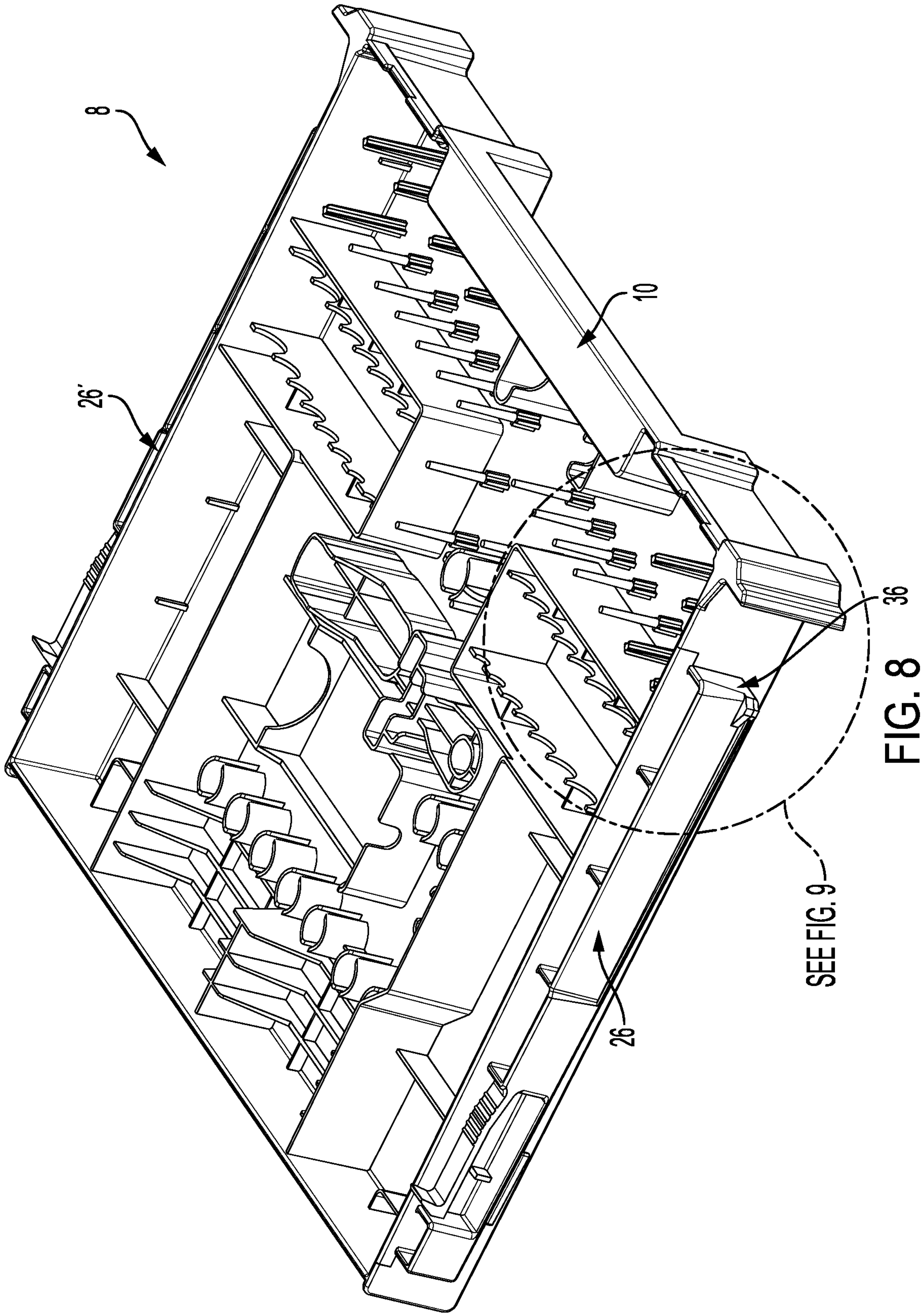
FIG. 8 shows a perspective view of one of the drawers.
Figure 9:
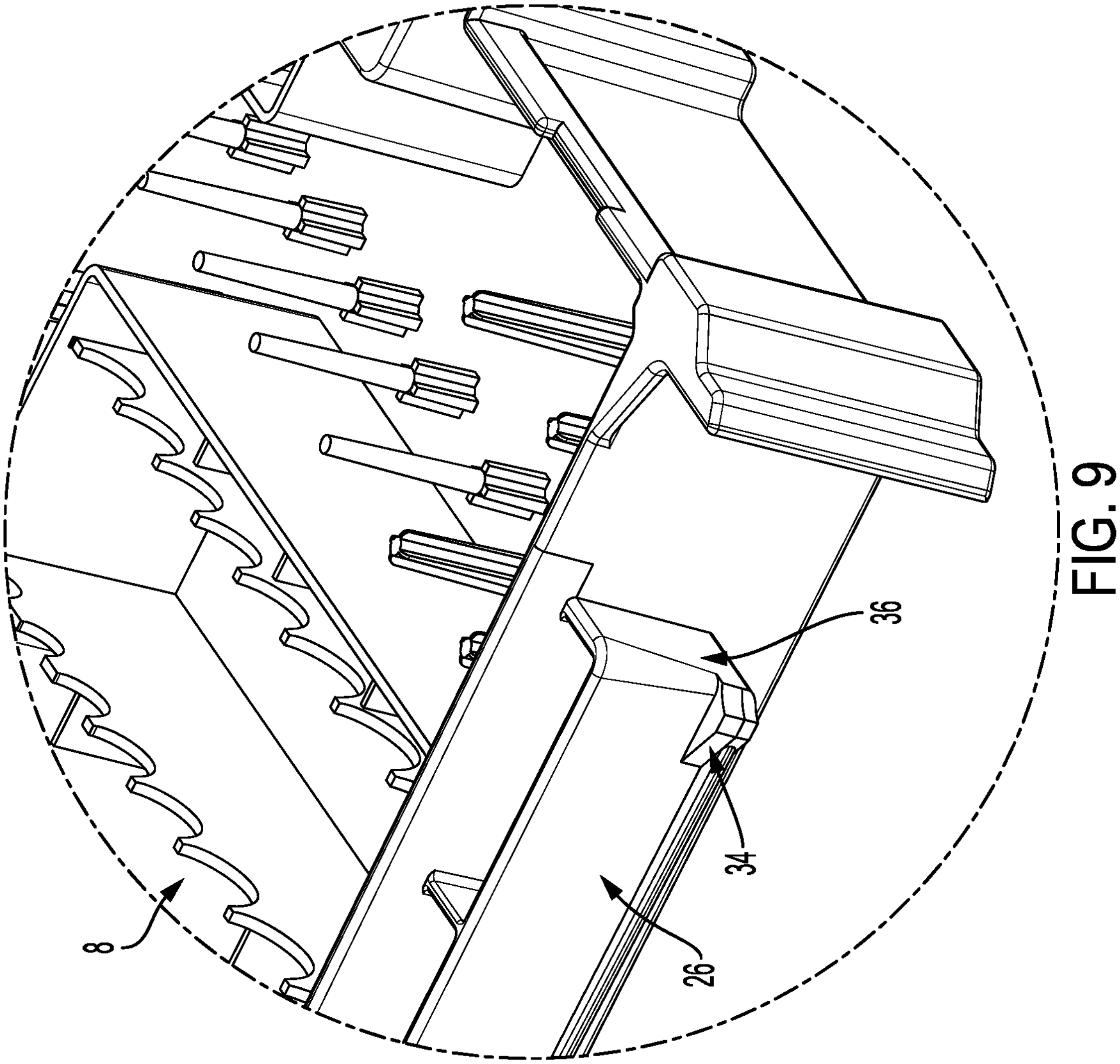
FIG. 9 shows a detailed perspective view of part of the drawer of FIG. 8.
Figure 10:
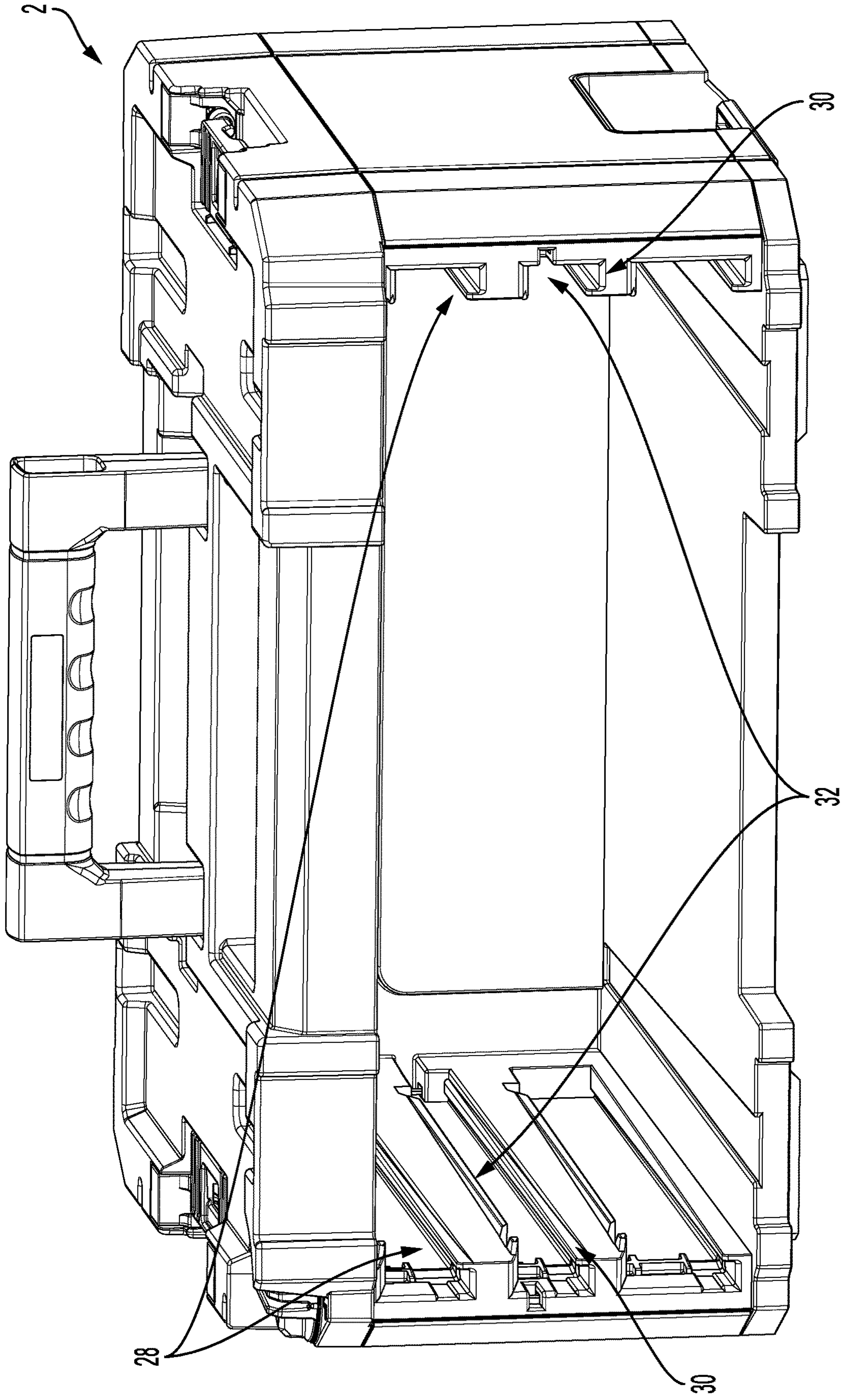
FIG. 10 shows a perspective view of the inside of the container of FIG. 1, with all drawers removed.

An important feature of the present invention is the wedge 34 which formed on each drawer 8. As the drawers 8 are arranged (via their upper and lower runners 28, 30) to be able to slide into and out of their respective drawer slots 32 (only one of which is shown, for clarity, at FIG. 10), each wedge 34 is shaped so as to permit closure of a drawer 8, even if the rotatable lock 16 has been rotated into its locked position. The reason this is possible is that the material from which the wedge 34 is formed is chosen to be resiliently deformable. An example of such material is a rubber compound. This means it is compressible, as the wedge is forced into engagement with the cam 18 as the drawer 8 is moved from its open to its closed position and when the rotatable lock is in its locked position (FIG. 7 and FIG. 11*d*). There is a ramping effect as the narrow part of the wedge first contacts the cam 18, which effect increases in force (a compression force applied to the material of the wedge) as the drawer 8 is further closed. Eventually, if sufficient closure force is applied to the drawer 8 via its handle 10 by a user, then the entire wedge 34 is compressed sufficiently to be forced past the cam 18 until the final position is achieved as shown in FIGS. 7 and 11*d*. In this final (closed) position, the wedge has taken up its original shape, having moved completely past the cam 18.

It will be appreciated that, as an alternative to the material of the wedge 34 being resiliently deformable, it is also possible for the engagement bar 26 and/or the outer front surface 36 of wedge 34 to be resiliently deformable, so that, as the wedge 34 is moved past the cam 18 (ie when the drawer 8 being moved from its open to its closed position), the increasing force placed upon the wedge 34/engagement bar 26 interface as a result of the drawer 8 movement, causes flexing and deformation of the engagement bar 26 to (as would be the case when viewing FIG. 7) the right, so that passage of the wedge 34 past the cam 18, whilst being in contact therewith, is possible. The same effect could be achieved (as an alternative to resilient deformation of the engagement bar 26, or in addition thereto) by the outer front surface 36 being compressible such that it can be shortened (again, in the direction towards the right as shown in FIG. 7) as the wedge 34 moves pat and in contact with the cam 18.

Importantly, due to the shape of the wedge 34 and the presentation of the outer front surface 36 to the cam 18, subsequent opening of the drawer is not possible unless and until the rotatable lock 16 is rotated through 90° into its open position, shown in FIG. 12, where a flat 20, as opposed to a cam 18 is opposite the outer front surface 36 of wedge 34.

Those skilled in the art will appreciate that the wedge 34 could be made from a non-resilient material. In this case, the cam 18 and/or the engagement bar 26 would need to be resilient and, preferably, made of a resiliently deformable material. The important requirement here is that there is the ability for the wedge 34 to move past the cam 18 when both i) the rotatable lock 16 is in its locked position and ii) the drawer 8 is open and desired to be closed; such that the drawer 8 can be moved (under force) past the cam 18 from its open to its closed position.

From the foregoing, it will be appreciated that by rotating the knob 22 between its two 90° spaced-apart positions, then selective alignment between either i) the cams 18, or ii) the flats 20 with the wedge 34 of each respective drawer 8 occurs. FIG. 11*d* shows the alignment of the cam 18 with the wedge 34 (ie the rotatable lock 16 is in its locked position) and FIG. 12*d* shows alignment of the flat 20 with the wedge 34 (ie the rotatable lock 16 is in its unlocked position). In the unlocked position of FIG. 12, there is no interaction between the flats 20 and wedges 34. This permits free movement of each drawer 8 between its open and closed positions.

When a drawer 8 is in its closed position, it is retained completely within the body of the container 2, as shown, for example in FIG. 2. When a drawer is closed like this, access to the inside of the drawer and hence its contents, is not possible.

Referring now to FIGS. 13-20, an alternative embodiment to that of FIGS. 1-12 is shown, although common components are labelled with the same reference numerals as per the earlier figures. Whilst the embodiment of FIGS. 13-20 also utilizes the drawer wedge 34, it operates in a slightly different manner in its interaction with the rotatable lock 16, as will be explained.

In FIG. 13-20, the rotatable lock 16 is spring-biased towards its locked position, with the ability for it to be rotated and held in its unlocked position. To achieve this a spring member 38 engages with the rotatable lock 16 and the plastics body 4 of container 2 so as to provide a torsion force therebetween. The rotatable lock 16 will always tend to rotate from its unlocked to its locked position in the alternative embodiment of FIGS. 13-20, unless it has been held or restrained in its unlocked position and is, therefore, unable to rotate. It is in this instance that deflection of the wedge 34 past the cam 18 (rather than the rotatable lock being rotated into its unlocked position) occurs. In particular, when the rotatable lock 16 is in its locked position and a drawer 8 is in its open position, movement of the drawer into its closed position will either cause the wedge 34 of the drawer 8 to resiliently deflect past the respective cam 18 of the rotatable lock 16 (as in the previous embodiment of FIGS. 1-12), or cause the rotatable lock 16 to rotate from its locked to its unlocked position (in either case, permitting closing of the drawer 8).

Referring now particularly to FIGS. 16-20, the sequence of moving a drawer from its open to its closed position, when the rotatable lock is initially in its locked position, is shown. In FIGS. 16 and 17, the rotatable lock 16 is in its locked position. This is its normally biased position as result of the force of spring 38 being held under tension and applying torque thereto (in a clockwise sense as viewing the figures). The spring member 38, which has one end 38*a* coupled to knob 22 spigot 40 and its other end 38*b* coupled to container spigot 42, is placed under tension, in known manner.

The underside of knob 22 carries two spigots; the first spigot, 40 engages with the end 38*a* of the spring 38. Both the first and second knob spigots 40, 44 respectively are arranged to travel within arcuate slot 46 formed in the body of the container 2 as the rotatable lock 16 rotates.

The rotatable lock 16 may be held in its unlocked position as result of the interaction between the spigots 40, 44 and two diametrically-opposed arcuate lands 48 formed on the inner surface of arcuate slot 46. If the knob 22 (or indeed the rotatable lock 16) is rotated anti-clockwise (as the figures are viewed) with sufficient force that each spigot 40, 44 is able to move past and over its respective land 48, then, on removal of that rotational force, the interaction of the lands 48 with the spigots 40, 40 holds the spigots in place (ie in its unlocked position). Unless sufficient force in a clockwise sense is applied to the rotatable lock 16, the spigots 40, 44 are unable to ramp over the lands 48 to return the rotatable lock 16 to its normally locked position.

In its locked state, the rotatable lock 16 presents its cam 18 to the drawer wedge 34. In its unlocked state, the rotatable lock 16 presents its flat 20 to the drawer wedge 34.

Movement of the drawer 8 towards its closed position, as shown in FIG. 18*a* causes the wedge 34 to push against the cam 18 and hence apply torque (anti-clockwise as viewing FIG. 18*b*) to the rotatable lock 16. This causes the spigots 40, 44 to move anti-clockwise away from their locked position and travel within slot 46 towards their respective lands 48, hence, causing partial rotation of the rotatable lock 16, as shown in FIGS. 18*a* and 18*b*.

Continued closing of the drawer 8 results in the situation shown in FIGS. 19*a* and 19*b*. In FIG. 19*b*, the rotatable lock 16 has been moved into its unlocked position and hence the drawer has been closed. Importantly, it can be seen from FIG. 19*b* that the spigots 40, 44 are abutting against, but have not been moved (anti-clockwise) past their respective lands 48. This means that as soon as the wedge 34 of drawer 8 has moved past the cam 18 of rotatable lock 16, then (unless the knob 22 is either held fast, or rotated further anticlockwise by a user such that the spigots do move over and past their respective lands 48) the rotatable lock 16, under the action of the spring 38 tension, will rotate clockwise back into its unlocked position (as shown, for example, in FIG. 17*b*). This means, therefore, unless a user rotates knob 22 such that the rotatable lock is moved into its unlocked position as shown in FIGS. 20*a* and 20*b*, where the spigots 40, 44 are retained in slot 46 by their respective lands 48 (having been moved over and past the lands 48), then the drawer 8 is now retained in its closed position within container 2, as the rotatable lock has automatically sprung back under the action of spring 38 to its normally locked state.

FIGS. 20*a* and 20*b* show the situation where a user has rotated knob 22 such that the rotatable lock is held in its unlocked position.

Although the described detent provides physical contact between the engagement means of the storage sections and the detent mechanisms, as described above, other detent mechanisms are within the scope of the invention, such as magnetic switched lock elements. Such a magnetic lock would have magnets (such as an electromagnet) on the rotatable lock and/or each drawer. The electromagnet can be selectably activated (locked) or de-activated (unlocked) to allow the retention (locked) of each drawer in its closed position (and to be able to move from its open to its closed position), or to prevent opening of the drawer (locked)

The example and alternative embodiments described above may be combined in a variety of ways with each other. It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. Furthermore, the steps and number of the various steps illustrated in the figures may be adjusted from that shown. The accompanying figures and attachments illustrate exemplary embodiments of the invention.

Although the present invention has been described in terms of particular example and alternative embodiments, it is not limited to those embodiments. Alternative embodiments, examples, and modifications which would still be encompassed by the invention may be made by those skilled in the art, particularly in light of the foregoing teachings.

What is claimed is:

1. A container comprising:

a plurality of storage sections for containing items therein; each storage sections of the plurality of storage sections being movable between an open position and a closed position independently of any of the other of the storage sections of the plurality of storage sections; and wherein, in the open position, items within the storage sections are accessible, and, when in the closed position, items within the storage sections are inaccessible; and a rotatable detent mechanism comprising an elongate body including a series of both cams and flats disposed along it length between first and second ends, wherein the flats are defined in the elongat body, the detent mechanism having locked and unlocked states wherein, when in the locked state, the detent mechanism is arranged to restrain each storage section of the plurality of storage sections in its respective closed position, and, when in its unlocked state, the detent mechanism permits movement of each storage section of the plurality of storage sections freely between its open and closed positions;-and wherein each storage section of the plurality of storage sections includes engagement means for interacting with a respective cam in the series of cams of the detent mechanism when the detent mechanism is in its locked state, such that, if a storage section of the plurality of storage sections is in its closed position, it may not be moved to its open position, and if a storage section of the plurality is in its open position, it may be moved to its closed position.

2. A container according to claim 1, wherein the interaction between the detent mechanism and the engagement means comprises physical contact therebetween.

3. A container according to claim 1 wherein the detent mechanism is movable to align either a cam of the series of cams, or a flat of the series of flats, with a respective storage section engagement means.

4. A container according to claim 3 wherein the movement of the detent mechanism comprises rotation thereof.

5. A container according to claim 1, wherein the engagement means of each storage section of the plurality of storage sections comprises a wedge which is positioned to move past the detent mechanism when the detent mechanism is in its unlocked position and when the storage section is being moved from its open to its closed position.

6. A container according to claim 5, wherein the wedge is unable to move past the detent mechanism when the detent mechanism is in its locked position and the storage section is in its closed position.

7. A container according to claim 5, wherein the wedge of each storage section interacts with a respective cam of the detent mechanism and does not interact with a respective flat of the detent mechanism.

8. A container according to claim 1, wherein the plurality of storage sections comprise a plurality of drawers.

9. A container according to claim 1, wherein moving at least one of the drawers from its open to its closed position, whilst the detent mechanism is in its locked state, causes the engagement means to rotate the detent mechanism into its unlocked state.

10. A container, comprising:

a body;

a plurality of drawers disposed in the body, each drawer in the plurality of drawers having a wedge disposed on an exterior surface thereof, and each drawer in the plurality of drawers being independently movable between an open state and a closed state; and a detent mechanism rotatably disposed in the body and movable between an unlocked state in which each drawer in the plurality of drawers is freely movable to the open state and to the closed state and a locked state in which each drawer in the plurality of drawers is movable to the closed state but immovable to the open state, the detent mechanism comprising an elongate body including a plurality of cams configured to interact with respective wedges of the plurality of drawers, and a plurality of flats defined in the elongate body between its first and second ends.

11. The container of claim 10, further comprising a first plurality of locators disposed on the body and configured to lock to a corresponding plurality of locators disposed on a second body of a separate container such that the body is stackable with the second body.

12. The container of claim 11, further comprising a second plurality of locators disposed on the body and configured to lock to the corresponding plurality of locators, wherein the first plurality of locators is disposed on an upper end of the body and the second plurality of locators is disposed on a lower end of the body.

13. The container of claim 10, wherein the detent mechanism comprises a dial at a first end thereof, the detent mechanism being rotatable via the dial about a longitudinal axis of the elongate body between the locked state and the unlocked state.

14. The container of claim 13, wherein the detent mechanism comprises a fit retainer at a second end thereof opposite the first end, the fit retainer being configured to prevent longitudinal translation of the detent mechanism along the longitudinal axis.

15. The container of claim 10, wherein the plurality of cams comprises a series of cams disposed along a length of the elongate body, each cam in the series of cams being configured to contact a respective wedge when the detent mechanism is in the locked state.

16. The container of claim 15, wherein the plurality of flats comprises a series of flats disposed along a length of the elongate body, each flat in the series of flats being rotationally offset from a respective cam in the series of cams.

17. The container of claim 10, wherein the detent mechanism comprises a dial at a first end thereof, the detent mechanism being rotatable via the dial about a longitudinal axis of the elongate body between the locked state and the unlocked state.

18. The container of claim 17, wherein the detent mechanism comprises a fit retainer at a second end thereof opposite the first end, the fit retainer being configured to prevent longitudinal translation of the detent mechanism along the longitudinal axis.

19. A container, comprising:

a plurality of drawers independently movable between an open state and a closed state, each drawer in the plurality of drawers having a wedge disposed on an exterior surface thereof; and a detent mechanism having an elongate body including a series of both cams and flats disposed along its length between first and second ends, wherein the flats are defined in the elongate body, the detent mechanism being movable between:

an unlocked state in which the wedge of each drawer in the plurality of drawers is freely movable past the elongate body to place drawer in the open state or to place the drawer in the closed state; and a locked state in which the wedge of each drawer in the plurality of drawers is freely movable past the elongate body to place the drawer in the closed state and immovable past the detent mechanism such that the drawer cannot be placed in the open state.

* * * * *